US008363623B2

(12) United States Patent
Larsen

(10) Patent No.: US 8,363,623 B2
(45) Date of Patent: Jan. 29, 2013

(54) ADAPTIVE ANTENNA SYSTEM FOR DIVERSITY AND INTERFERENCE AVOIDANCE IN A MULTI-STATION NETWORK

(75) Inventor: James David Larsen, Woodinville, WA (US)

(73) Assignee: MOSAID Technologies Incorporated, Ottawa (CA)

( * ) Notice: Subject to any disclaimer, the term of this patent is extended or adjusted under 35 U.S.C. 154(b) by 603 days.

(21) Appl. No.: 12/518,905

(22) PCT Filed: Dec. 14, 2007

(86) PCT No.: PCT/IB2007/055117
§ 371 (c)(1),
(2), (4) Date: Jun. 12, 2009

(87) PCT Pub. No.: WO2008/072210
PCT Pub. Date: Jun. 19, 2008

(65) Prior Publication Data
US 2010/0034134 A1 Feb. 11, 2010

Related U.S. Application Data

(60) Provisional application No. 60/874,902, filed on Dec. 14, 2006.

(51) Int. Cl.
*H04W 4/00* (2009.01)
(52) U.S. Cl. ..................................... 370/334; 455/63.1
(58) Field of Classification Search .................. 370/315, 370/334; 455/63.1
See application file for complete search history.

(56) References Cited

U.S. PATENT DOCUMENTS

| 6,097,703 | A | 8/2000 | Larsen et al. |
| 6,473,617 | B1 | 10/2002 | Larsen et al. |
| 6,785,510 | B2 | 8/2004 | Larsen |
| 6,810,428 | B1 * | 10/2004 | Larsen et al. ................. 709/238 |
| 6,965,568 | B1 | 11/2005 | Larsen |
| 7,590,068 | B2 | 9/2009 | Larsen et al. |

(Continued)

FOREIGN PATENT DOCUMENTS

| GB | 2 349 045 | A | 10/2000 |
| GB | 2349045 | A | 10/2000 |

(Continued)

*Primary Examiner* — Sai-Ming Chan
(74) *Attorney, Agent, or Firm* — Don Mollick

(57) ABSTRACT

The invention provides a method of operating a communication network and a network itself. The network comprises a plurality of wireless stations, each station being able to transmit and receive data so that the network can transmit a message comprising a plurality of data packets from an originating station to a destination station via at least one intermediate station. At least some of the stations have a controllable antenna system operable to direct a null selectively. The method includes selecting, at each station, one or more probing channels for the transmission of probe signals to other stations. At stations having a controllable antenna system, the presence of interference on said one or more probing channels is detected, and one or more nulls are selectively directed towards the source or sources of the interference. Typically, a null is directed towards a source of interference where the level of the interference exceeds a predetermined level. Each station transmits neighbor gathering probe signals on the selected probing channel or channels, and other stations which receive the neighbor gathering probe signals from a probing station respond directly or indirectly to thereby indicate to the probing station their availability as destination or intermediate neighbor stations. The presence of the nulls affects the ability of other stations to receive the neighbor gathering probe signals, and the resulting variations in the connectivity between stations provides variations in the availability of neighbor stations to each station.

18 Claims, 26 Drawing Sheets

ODMA Adaptive Array
Coverage; Main Lobes Directed
to Neighbor Gathering; Null
Directed to Interference Source

U.S. PATENT DOCUMENTS

| | | | |
|---|---|---|---|
| 2002/0136179 A1* | 9/2002 | Aoyama et al. | 370/335 |
| 2002/0181444 A1 | 12/2002 | Acampora | |
| 2002/0191573 A1 | 12/2002 | Whitehill et al. | |
| 2003/0120809 A1* | 6/2003 | Bellur et al. | 709/239 |
| 2005/0063356 A1 | 3/2005 | Larsen et al. | |
| 2005/0135242 A1 | 6/2005 | Larsen et al. | |
| 2005/0135270 A1 | 6/2005 | Larsen et al. | |
| 2007/0280262 A1 | 12/2007 | Larsen et al. | |
| 2008/0261605 A1 | 10/2008 | Larsen | |
| 2008/0280625 A1 | 11/2008 | Larsen | |
| 2009/0133105 A1 | 5/2009 | Larsen | |

FOREIGN PATENT DOCUMENTS

| | | |
|---|---|---|
| WO | 98/56440 | 12/1998 |
| WO | WO 98/56140 A | 12/1998 |
| WO | 2006/123218 A2 | 11/2006 |

* cited by examiner

Side View of
Coverage Pattern

Top View of
Coverage Pattern

Top View of
Switched Beam
Coverage Pattern

Typical Adaptive Array
Coverage; Main Lobe Directed
to User, Null Directed to
Interference Source ODMA Adaptive Array
Coverage; Main Lobes Directed
to Neighbor Gathering; Null
Directed to Interference Source

ADAPTIVE ANTENNA SYSTEM FOR DIVERSITY AND INTERFERENCE AVOIDANCE IN A MULTI-STATION NETWORK

CROSS-REFERENCE TO RELATED APPLICATIONS

This is a U.S. National Phase application corresponding to International Patent Application No. PCT/IB2007/055117 filed Dec. 14, 2007, published on Jun. 19, 2008 in the English language and claiming the benefit of priority of U.S. Provisional Patent Application Ser. No. 60/874,902 filed Dec. 14, 2006.

BACKGROUND OF THE INVENTION

THIS invention relates to a method of operating a multi-station communication network, and to a network as such, of the general kind described in International patent applications nos. WO 96/19887 and WO 98/56140.

Networks of this kind can be utilized commercially, with users being subscribers who are billed for their use of the network. Alternatively, networks of this kind may be utilized by security forces such as police or military forces. A further application for networks of the kind referred to is in Wireless Local Area Networks (WLANs), where a wireless network can be combined with conventional network structures to service fixed and mobile network users. Such networks are usually, but not necessarily, computer networks.

In certain bands, such as the 802.11 standard, the functionality of the network can be compromised by factors such as path loss, the lack of signal penetration, the insufficiency of stations available to serve as intermediary stations and the abundance of various sources of interference.

It is an object of the present invention to provide connectivity possibilities in difficult radio environments, such as in low density, cluttered and/or high interference environments.

SUMMARY OF THE INVENTION

According to a first aspect of the invention there is provided a method of operating a communication network comprising a plurality of wireless stations, each station being able to transmit and receive data so that the network can transmit a message comprising a plurality of data packets from an originating station to a destination station via at least one intermediate station, wherein at least some stations have a controllable antenna system operable to direct a null selectively, the method including the steps of:
  selecting, at each station, one or more probing channels for the transmission of probe signals to other stations;
  detecting, at stations having a controllable antenna system, the presence of interference on said one or more probing channels and selectively directing one or more nulls towards the source or sources of the interference; and
  transmitting neighbor gathering probe signals from each station on the selected probing channel or channels, other stations which receive the neighbor gathering probe signals from a probing station responding directly or indirectly to thereby indicate to the probing station their availability as destination or intermediate neighbor stations;
  wherein the presence of said null or nulls affects the ability of other stations to receive the neighbor gathering probe signals, the resulting variations in the connectivity between said each station and other stations thereby providing variations in the availability of neighbor stations to said each station.

Preferably, a null is directed towards a source of interference where the level of the interference exceeds a predetermined level.

In a preferred embodiment of the method, the predetermined level of interference corresponds to the ambient noise floor on said probing channel.

The method may include operating an antenna system at one or more stations to steer the radiation pattern of the antenna system in order to direct one or more nulls towards the sources of interference, thereby affecting connectivity of neighbouring stations and introducing diversity into the connectivity options available to the stations.

A source of interference may be a neighbor station, said each station directing a null towards the neighbor station to reduce or eliminate mutual interference.

In such a case, two or more neighbor stations may direct nulls toward each other.

Stations with controllable antennas may direct beams selectively, the method including mapping, at each such station, the location of other stations to a particular beam or beams for ongoing communication.

Stations with controllable antennas may monitor said one or more probing channels for noise or interference, the method including mapping, at each such station, the location of other stations to a particular beam or beams determined to provide relatively noise or interference free communication to said other stations.

The method may include storing data relating to the mapped locations at each station, and transmitting the data to other stations in probe signals.

Preferably, a station transmitting a probe signal or data to another station selects a beam previously determined to be interference or noise free.

Further according to the invention there is provided a communication network comprising a plurality of wireless stations, each station being able to transmit and receive data so that the network can transmit a message comprising a plurality of data packets from an originating station to a destination station via at least one intermediate station, wherein at least some stations have a controllable antenna system operable to direct a null selectively, and wherein each such station is operable to:
  select one or more probing channels for the transmission of probe signals to other stations;
  detect the presence of interference on said one or more probing channels and selectively directing one or more nulls towards the source or sources of the interference; and
  transmit neighbor gathering probe signals from each station on the selected probing channel or channels, other stations which receive the neighbor gathering probe signals from a probing station responding directly or indirectly to thereby indicate to the probing station their availability as destination or intermediate neighbor stations;
  wherein the presence of said null or nulls affects the ability of other stations to receive the neighbor gathering probe signals, the resulting variations in the connectivity between said each station and other stations thereby providing variations in the availability of neighbor stations to said each station.

DESCRIPTION OF EMBODIMENTS

Figure 1B:
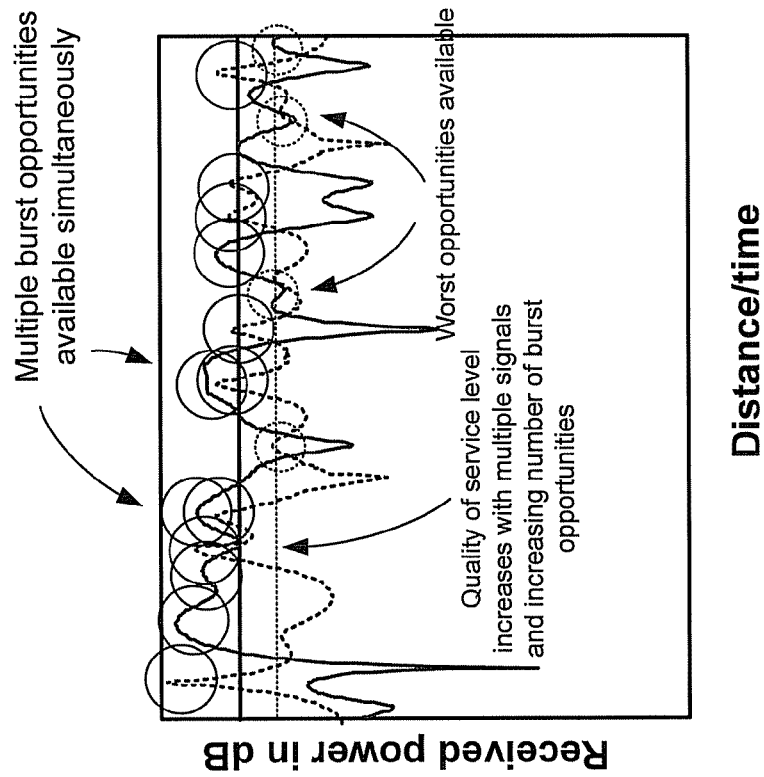
FIGS. 1 (a) and (b) show a plot of signal strength against distance or time illustrating transmission opportunities available to a station with one and several neighbors, respectively.

The present invention relates, broadly, to a method of operating a multi-station communication network of the kind described in International patent applications nos. WO 96/19887 and WO 98/56140, the contents of which are incorporated herein by reference.

Networks of this kind use opportunistic relaying techniques to transmit message data from source to destination stations, utilising intermediate stations as relays when required, and are referred to herein as ODMA networks, for Opportunity Driven Multiple Access. The ODMA methodology can be applied to both wireless (typically radio) and wired communication media. The basic operation of such a network is described in Appendix A.

In a radio environment, dramatic fluctuations in available connectivity arise due to path loss and multi-path distortions, such as those modeled by Ricean and Rayleigh fading which illustrate the destructive and constructive interference caused by waves. Moreover, if the devices are moving then the rate of change in these fluctuations is even more pronounced.

In the ODMA over wireless methodology, the path conditions and background noise at each neighbor station are dynamically determined from the probing processes and the combination of slow probe and fast probe mechanisms means that any sending station only needs to ascertain that certain of the neighbors have a lower cost to destination than the station wishing to send data. The averaged variations in connectivity between a source and destination station over time are determined through the probed cost information, but an RTS/CTS cycle is used to determine the exact fluctuations experienced between a sending station and a neighbor at the moment of any transmission. From these interactions, a decision is made opportunistically at the moment before the data is sent—packet by packet—in respect of the best connectivity to the neighbor.

The RTS/CTS data transport protocols used in relation to ODMA are described in International Patent applications PCT/IB2004/004109, PCT/IB2004/004111, PCT/IB2005/003141 and PCT/IB2007/054966. Concisely, messages are broken into packets at the sending station. A station with a packet to send broadcasts a Request to Send message (RTS). Neighboring stations that are available and are closer (gradient-wise) to the destination transmit back a Clear to Send message (CTS); and possibly a Ready to Receive message (RTR) for multi-channel systems. The data packet is transmitted to one of those stations. When it is received, the receiving station may transmit a Packet Acknowledge message (ACK) back to the transmitting station. At the destination station, all packets are collected and re-assembled into the message. Once the entire message has been received, an End-to-End Acknowledge message (End-to-End ACK) may be transmitted back to the message originating station.

Through the collection of neighbors in the ODMA slow probe process, and through the information received in various RTS/CTS exchanges, ODMA transmissions may be sent at "peaks of opportunity" in connectivity. This means ODMA is able to take advantage of the very best connectivity conditions that may be available at any given moment (even if these preferable conditions are only fleetingly available) and the path taken is not committed to a single route.

Figure 1A:
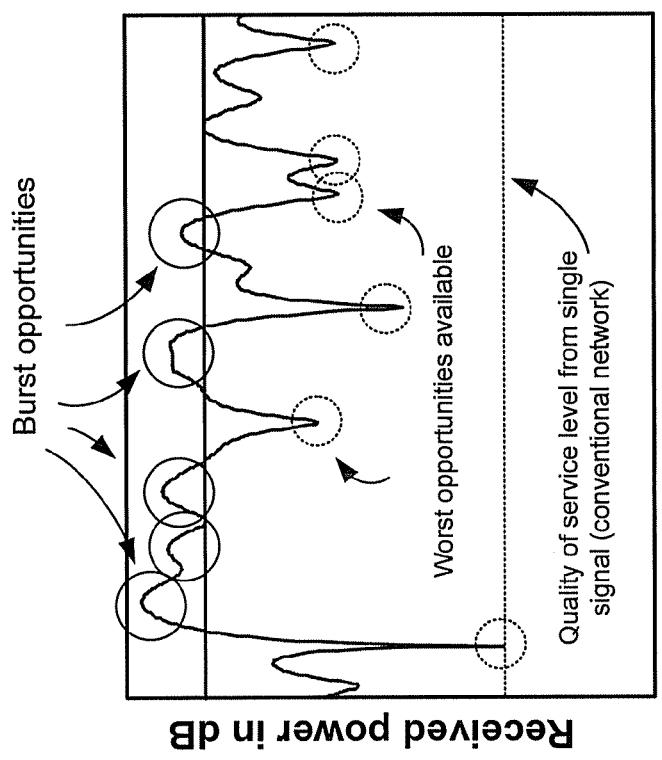

As connectivity conditions in wireless networks are so highly dynamic and changeable, the conditions that could be experienced in the different paths available are typically not correlated with respect to one another and consequently "diversity" is created (taking differing routes and experiencing entirely different conditions). This concept is illustrated in FIGS. 1(a) and 1(b). In FIG. 1(a), a typical signal is shown in which peaks of opportunity may be evident at random intervals. It should be obvious that identifying these conditions and transmitting at these moments is highly advantageous. As a general rule, signals tend to fade with increasing distance, but as shown in the graphs, it is very possible that significant path loss can be experienced at small distances while very low path loss might be experienced at great distances.

Having several neighbors provides diversity in the connectivity options that are available to a station and makes more of the peaks of opportunity accessible in the transmissions; and in fact once sufficient neighbors are located the "burst" opportunities actually become available to the station all of the time, as is illustrated in FIG. 1 (b) where an additional neighbor is shown as now being available. The second available signal provides uncorrelated peaks as illustrated. It will be appreciated that if more stations were available, the effect would be to ensure that there are transmission opportunities available continuously at very high levels of connectivity.

Indeed, in some circumstances there will be multiple peaking signals available as choices.

Where no signals are available at peak burst levels, it will be appreciated that the transmission will be possible at the best of the poor choices available, which means that the quality of service available is more consistent and at a higher level than if only one signal was available. The ability to transmit at peaks of opportunity means that greater range and data rates are possible at lower transmitted power levels, which in turn minimizes the interference with other stations attempting transmissions.

The availability of multiple uncorrelated options makes the network extremely robust, and this diversity is critical in the optimization of ODMA communication. Typically this diversity is created simply by fluctuations caused in the environmental conditions, through the relative movement of the stations and path characteristics such as path loss, multi-path distortion, background noise, interference and other factors.

However, in certain circumstances it becomes difficult to obtain the level of diversity required. Key examples of such circumstances are highly cluttered environments (such as in streets surrounded by relatively high or closely positioned buildings, or where there are thick trees and/or vegetation); where there are one or more significant sources of interference in the environment; where there is relative stability in the connectivity conditions; and finally where there are an insufficient number of stations available to serve as intermediary relaying stations.

Figure 2:
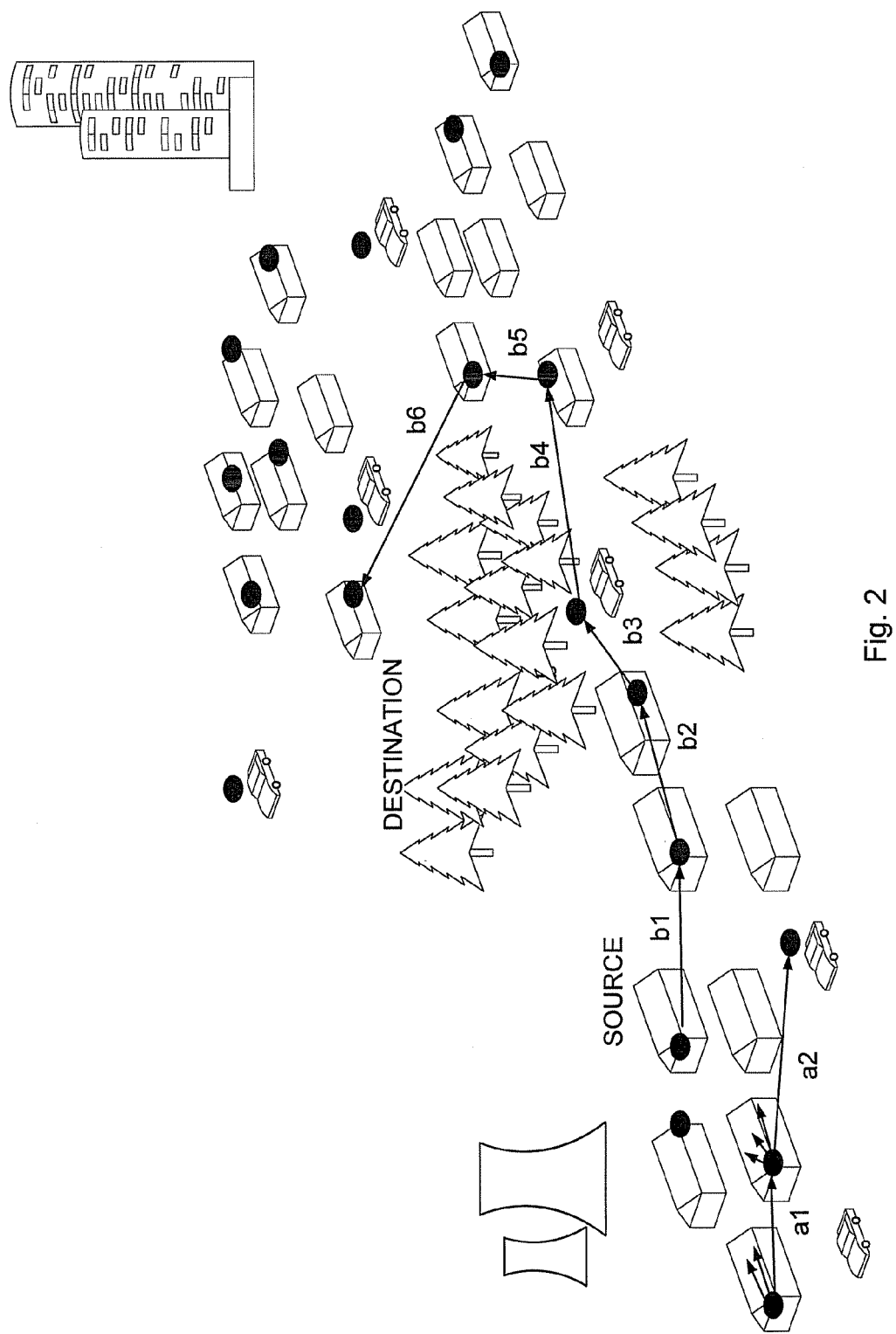
FIG. 2 is a schematic diagram of a wireless local area network (WLAN) operating in a cluttered environment with limited diversity, showing the routing options available between source and destination stations.

FIG. 2 illustrates a cluttered environment problem in a WLAN environment. In the region, it can be seen that a number of stations are operating at ground level. A station S1 is readily able to transmit a message to a destination station D1; having multiple neighbor stations available to serve as intermediaries at each node in the route as is indicated in the figure (through hops a1 and a2). However, a station S2 wishes to send a message to destination D2: where the stations are separated by a thick forest. Subsequently, in such a cluttered environment many of the stations have little or no choice of neighbors at all (see hops b1-b4) so the routing is merely a "daisy chain" of relays without any benefit of the ODMA methodologies. The routing in a Manhattan style urban environment might experience this effect.

There are potential solutions to mitigate the clutter problem. One is to provide additional stations (either subscriber or seed stations) in the area; another is to ramp up the power and/or change the frequency of modulation of the channel being utilized so there is increased penetration through and around the forest; and another is to make use of certain elevated positions in the region. In FIG. 2, there are already high sites available (tall buildings and a cooling tower). However, as depicted in FIG. 3, it would also be possible to mount a station on a tower specifically erected for the purpose.

In the initial stages of a WLAN deployment there may be limited subscribers and the service provider may wish to limit infrastructural expenditure, so additional stations in the region may not be practical. In addition, the radio frequencies and transmission power levels available may be limited; such as in the unlicensed bands (such as applicable in the 802.11 standards).

Figure 3:
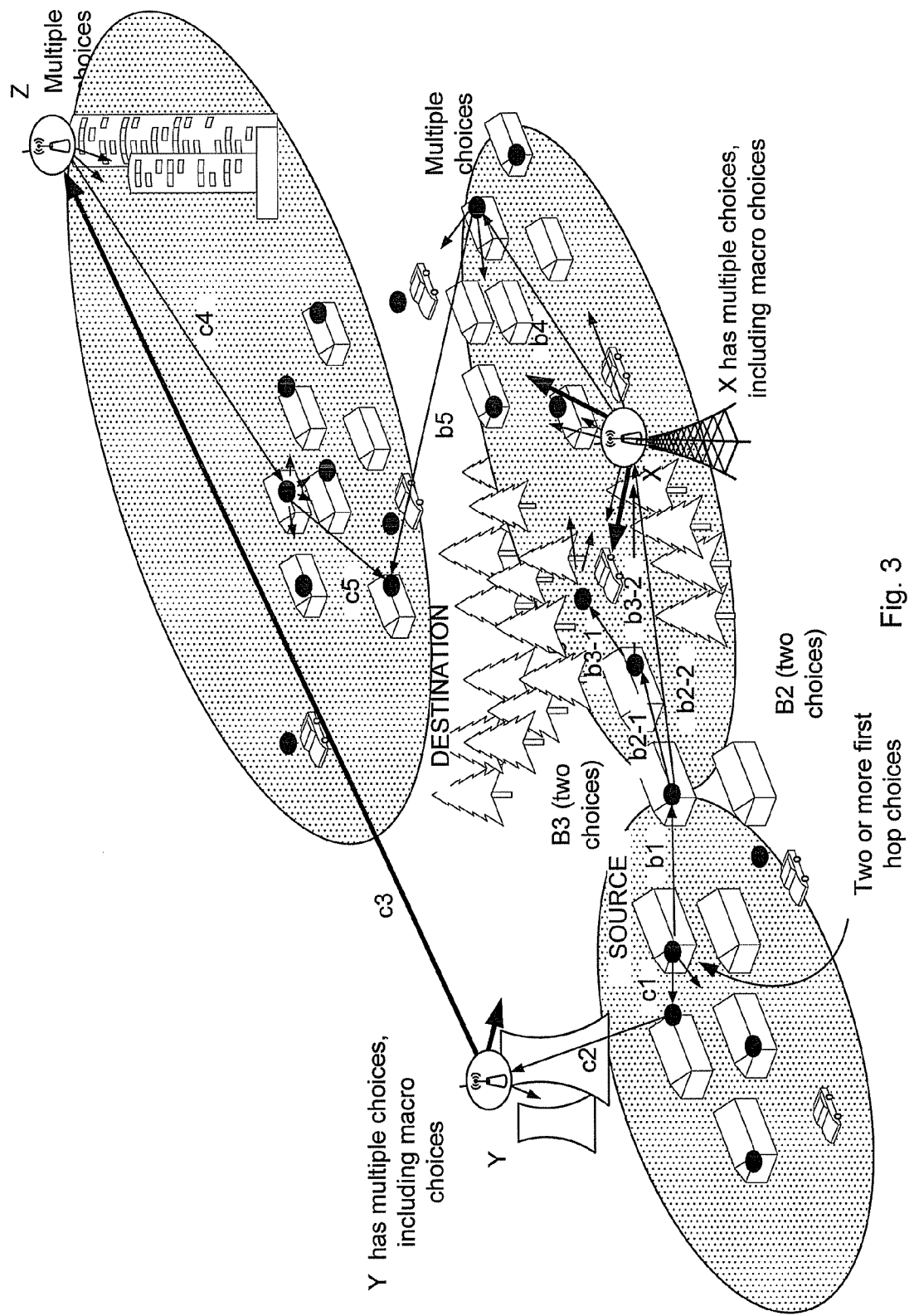
FIG. 3 is a similar diagram to FIG. 2, wherein micro and macro diversity are provided.

In an elevated location (high site), the station may be in a position to send and receive transmissions from a larger number of stations and over greater distances, as shown in FIG. 3, where the source station now has two alternative b2 hops (b2-1 down the original path of FIG. 2, and b2-2 to the high site at X, providing additional choices of neighbors to other high sites Z and Y). Hop b3 also has increased choices available by virtue of the high site (b3-1 and b3-2), and therefore it can be seen that there is increasing divergence of choices available en route before converging on the destination.

Alternatively, it can be seen that an entirely new direction to another elevated site at Y provides increased diversity (where a route c1-c5 is illustrated). The hop c3 is indicated as a thicker line, as it is envisaged in the example that the transmission of this hop is point-to-point, over wire (including a fiber connection) or over virtual wire (such as directed antenna arrangement, satellite, or private/public Internet). The linking of the sites with point-to-point auxiliary connectivity, or access to an auxiliary network, is discussed below in greater detail. The high site antennas providing connectivity down to stations below may be omni-directional, directional or sectored antennas, as appropriate, to cover the deployment area with best gain advantage.

Figure 4:
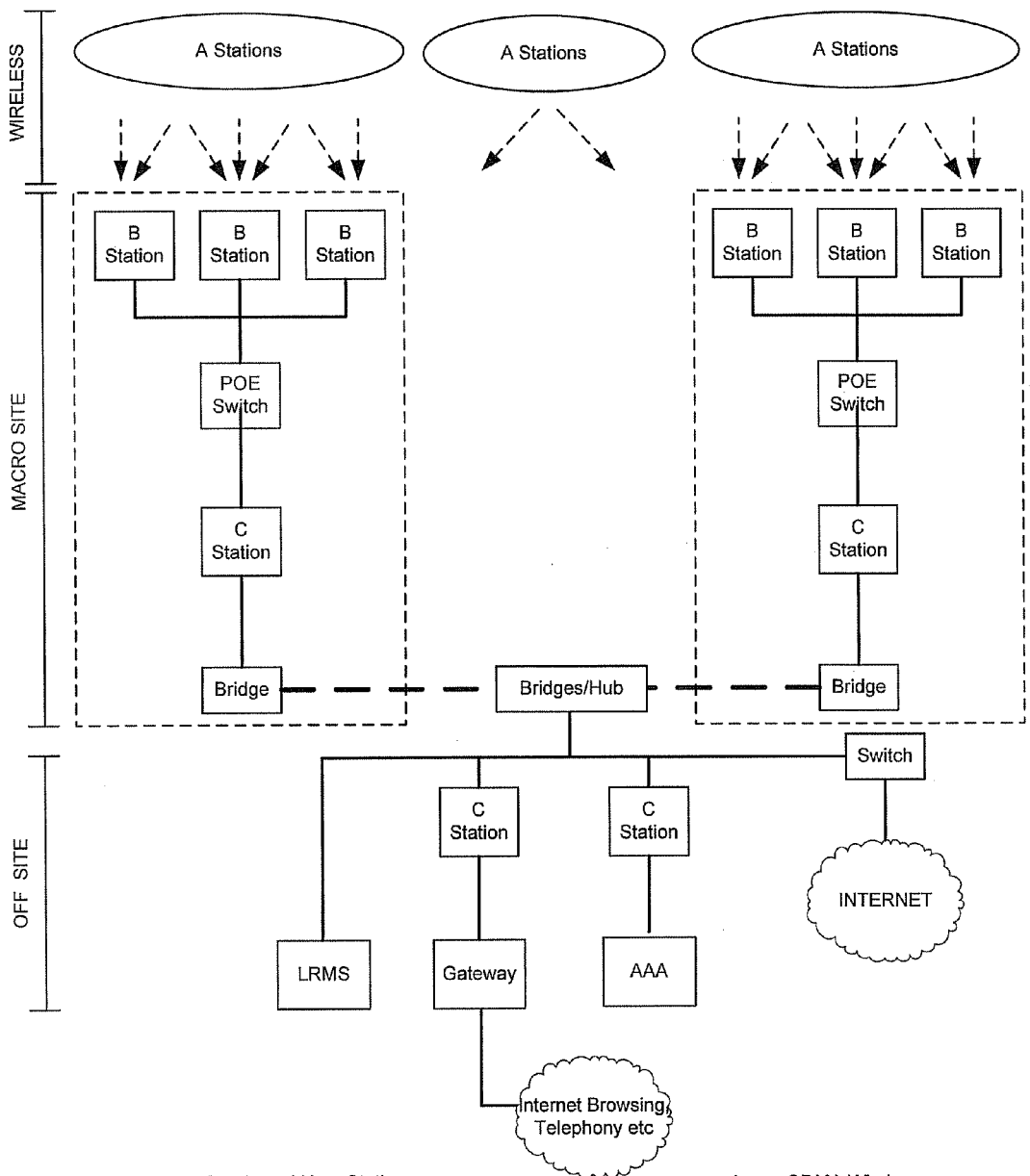
FIG. 4 is a block diagram of the component stations used in a macro site and in relation to an auxiliary network utilized for wide area macro coverage.

This auxiliary level of connectivity is significantly advantageous in a wide area deployment and is used in "macro" cells where stations are directed into areas below (which may be directed generally or specifically at certain locations). Even with 802.11a/b/g bands, such a footprint covered by a macro cell could be far greater than a GSM cell by virtue of the ODMA techniques incorporated. FIG. 4 shows the components included in the macro site stations of an embodiment of the invention, using terminology more fully described and detailed in Appendix A.

However, deploying stations at high locations can also create more interference problems. This is because the improved connectivity conditions available at elevated positions generally also results in more noise and interference being received effectively at the radio. In the unlicensed 802.11 bands, noise and interference can be received from many sources, such as microwave ovens, lighting systems, other communication systems such as WiFi access points, Bluetooth devices and cordless phones, and even high speed computer processors. At high sites the connectivity conditions tend to be more stable, as the relative movement of stations is less marked and there is generally less multi-path distortion to form the distinct peaks and troughs in the signal strengths between the stations; so with less constructive and destructive interference there are fewer opportunities created and reduced diversity.

Whether at low or high elevation, particular sources of interference might be present that detrimentally affect communications. It is an objective of the present invention to use adaptive antenna techniques in these environments. As an initial point of reference, there are ultimately two techniques used (alone or in combination) for addressing interference problems in order to provide effective communication. One way is to increase the signal to interference ratio by increasing the gain in the direction of the desired signal and increase the signal strength. The other is to increase the ratio by steering a null towards the source of the interference to reduce the effect of the interference. A null attenuates the signal, to reduce (nullify) the level of a particular source to an acceptable level (preferably beneath ambient background noise floor levels).

Figure 5:
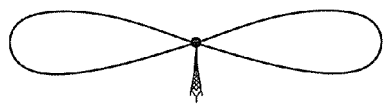
FIG. 5 is an elevation pattern (side view) and azimuth pattern (top view) of energy radiated from a typical omnidirectional antenna.
Figure 5:
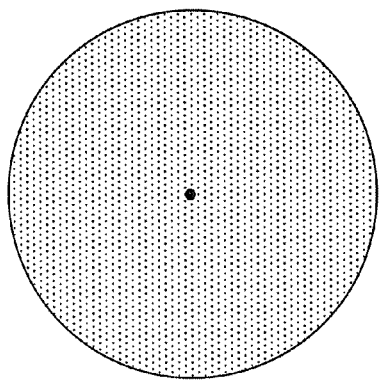

There are many different antenna types available, typically providing some variant of omni-directional, directional, or sectorized radiation coverage patterns. FIG. 5 shows the elevation pattern (side view) and azimuth pattern (top view) of energy radiated from a typical omni-directional antenna. The antenna power gain is the ratio of power input into the antenna to the power out (usually measured in dBi; the logarithmic gain relative to an isotropic (perfect spherical radiation pattern) antenna which has a linear gain of one). The directive gain is a measure of the concentration of the radiated power in a particular direction and is usually expressed as a ratio of the intensity in a directed orientation (over restricted azimuths) to the average intensity.

Figure 6:
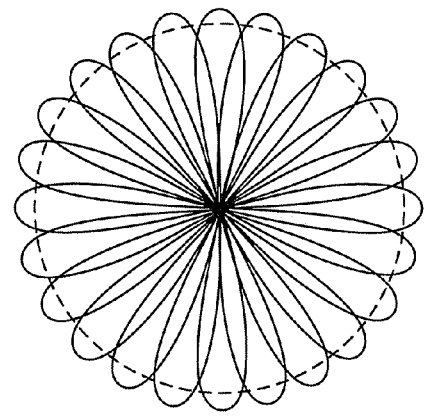
FIG. 6 is a top view of a switched beam coverage pattern, substantially covering the area depicted in FIG. 5.

Adaptive array antenna systems (that adapt their coverage patterns) and switched beam antenna systems (using beam combining strategies of multiple antennas to form beams with special selectivity) have become available, generally being referred to as "smart antenna systems". Coverage can be directed in azimuth and elevation. Both systems increase gain by forming specific beam patterns according to the location of the user, or other stations, in communication with the smart antenna station (directing the main lobe at the users/stations), although adaptive array antenna systems attempt to track and minimize interference. FIG. 6 shows a top view of a typical switched beam coverage pattern, substantially covering the area depicted in FIG. 5.

Figure 7:
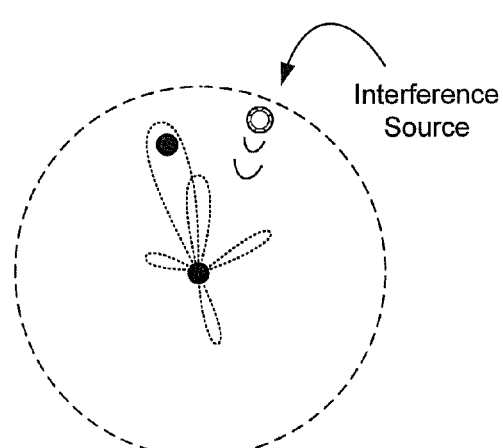
FIG. 7 is a coverage pattern of an adaptive array system directing a main lobe at the user station and directing a null at the source of interference.
Figure 8:
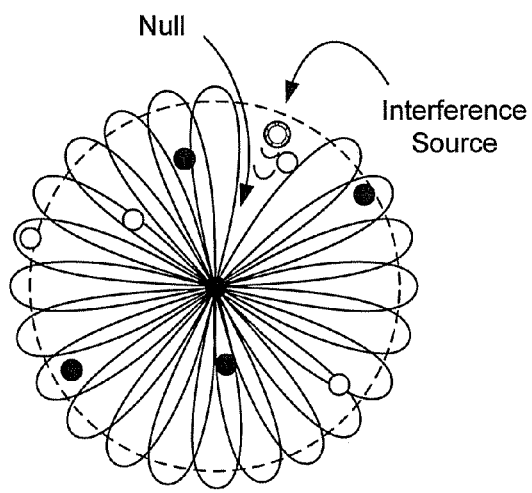
FIG. 8 is a coverage pattern similar to FIG. 6, where a predetermined number of stations are collected.

Although an adaptive array system can direct the main lobe at the user and direct a null at the source of interference (as shown in FIG. 7), the main aim of ODMA is the collection of a predetermined number of neighbors which will be changing as the conditions change and/or as stations move or switch off etc. Consequently, as shown in FIG. 8, the present invention provides for the coverage pattern to extend as required to maintain the requisite number of stations (solid black) as neighbors through probing from the stations available (white). In this figure, a null has been directed at the source of interference to minimize the effect of the interference, while maintaining coverage elsewhere. However, it can be seen that the formation of the null has excluded one of the stations (white) from being considered as a potential neighbor.

Indeed, the interference could actually be emanating from one of the neighbors of the station as that station attempts to transmit and receive messages with its own neighbor stations. In such circumstances, the station receiving the interference can assist the other transmitting station by directing a null at the neighbor transmitting and receiving data, before the station itself transmits its own messages.

In this way, with only the one station directing the null, the original neighbor will be able to send and receive messages at lower power levels without experiencing interference from the station itself now transmitting and receiving data; and the station now communicating will not be exposed to the interference from the original neighbor, and consequently its own power levels of emitted radiation to its modified group of neighbors can be minimized. In other words, steering the null at the neighbor benefits both stations and increases the probability of the transmission or receipt being successful. Obviously, nulls could be steered towards each other by both stations to effect a more complete isolation.

However, in the ODMA context, it should be evident that the use of gradients is helpful to a station wishing to send a message to maintain a sufficient number of alternative neighbors with lower costs to destination than the sending station, which can be selected opportunistically when one or more nulls have been directed at other stations or other sources of interference.

While the transmission of the slow and fast probes will typically require the sort of pattern shown in FIG. 8, it may be possible to generate more gain by directing a distinct beam on a particular station if needed once a station has been identified for communication. Also, it may be possible to send RTS or CTS messages to certain stations using distinct beams to the stations while reducing the beams in the other sectors to ensure the transmission levels are adequate and avoiding the interference with the nulls formed. In the ODMA neighbor gathering processes, the background noise level of a station is communicated to other stations so that the other stations can determine the level of power required to communicate with the station. As such, it is possible for a station to map the stations to a particular beam or beams for ongoing communication and to switch the beams on and off for the purpose of receiving or transmitting the RTS/CTS messages or the data based on criteria to avoid interference.

It is also possible to scan different channels to map any noise or interference in respect of the channels, the types of interference (for example, whether it is man-made or natural, a particular source type, intermittent, continuous, etc), and the beams that are affected; so that it is possible simply to jump with a reasonable degree of confidence to a previously determined interference/noise free beam. These maps could be stored in the neighbor tables of the stations and communicated to other stations through probing or in the RTS/CTS cycles.

Generally, it is preferable to reduce interference by directing nulls at the source of the interference, as this will reduce the power needed to transmit messages between other stations. However, the interference may emanate from multiple sources, particularly in omni-directional coverage areas. By nullifying the noise neighbors will be excluded; and too many nulls will limit the available diversity. Switched beam antennas and phased array antennas can steer nulls dynamically, which will also create peaks and troughs in the area of coverage that will affect the connectivity conditions experienced by the neighbors as signals transmitted strengthen and weaken.

This dynamic null creation at dominant interference sources, and the dynamic switching of antennas, will consequently automatically create diversity between the stations that are neighbors with each other by influencing the connectivity conditions and thereby varying the opportunities that will be available. Some stations will experience worse connectivity by virtue of the nulls and/or increased gain directed in certain directions, while others will identify peaks of opportunity. Therefore instead of simply monitoring the connectivity conditions in the environment and reacting, the antenna system will be able to reduce the impact of certain interference sources momentarily, enabling it to communicate at more efficient power levels with the stations that are relevant and to move the null(s) as needed in order to communicate with the various stations.

In order to understand this, assume that the depiction in FIG. 1 showed signals creating interference conditions. It should be evident that it would be advantageous to locate the gaps in the interference to minimize the effect of the interference, in which event the peaks of opportunity to send information through the interference would actually be the troughs identified in the interference signal. These troughs are essentially the gaps in the difficult conditions and a station can take advantage of these to send signals at minimal power levels and minimizing its own contribution to the difficult interference environment. Directing a null at a source of interference will lower the troughs created in the signals experienced and thereby create opportunities.

In this manner, a station can locate and utilize the clear segments, or holes/gaps in the interference, that are available in a noisy environment and get the data through where other transport mechanisms following a defined path would simply fail.

Figure 9:
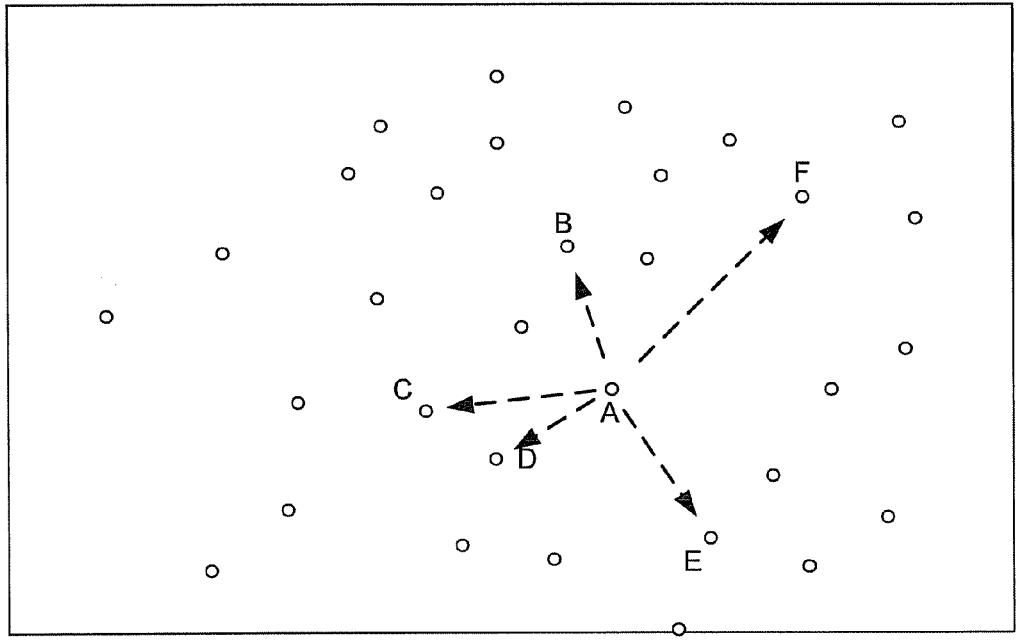
FIGS. 9 to 12 are a series of schematic diagrams showing the connectivity between stations and their neighbors in a WLAN.
Figure 10:
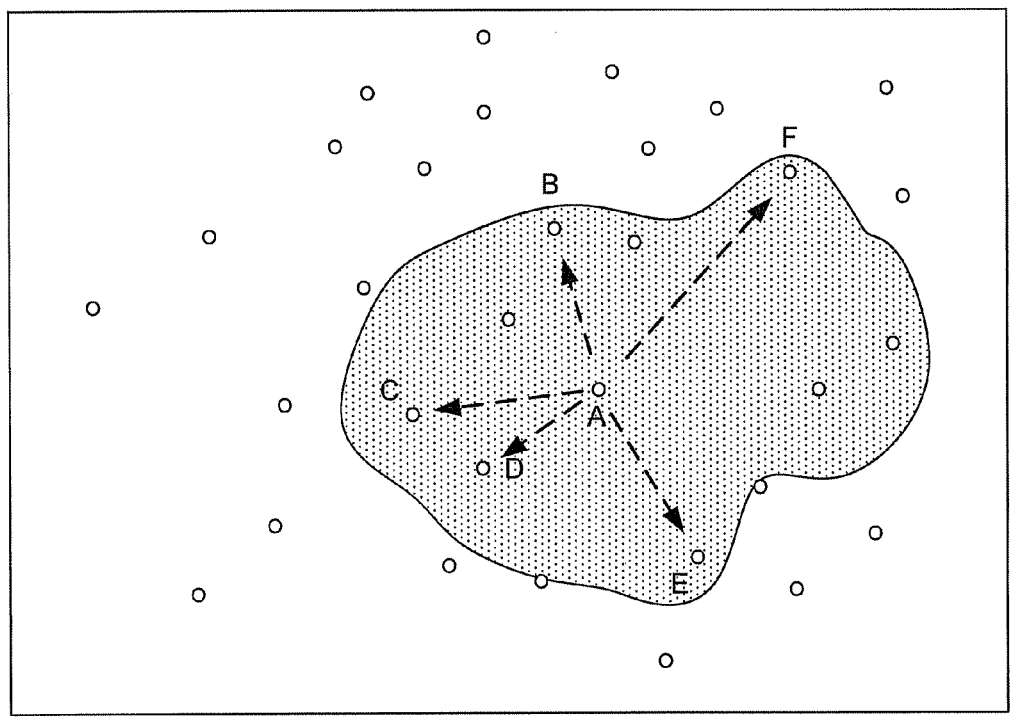
Figure 11:
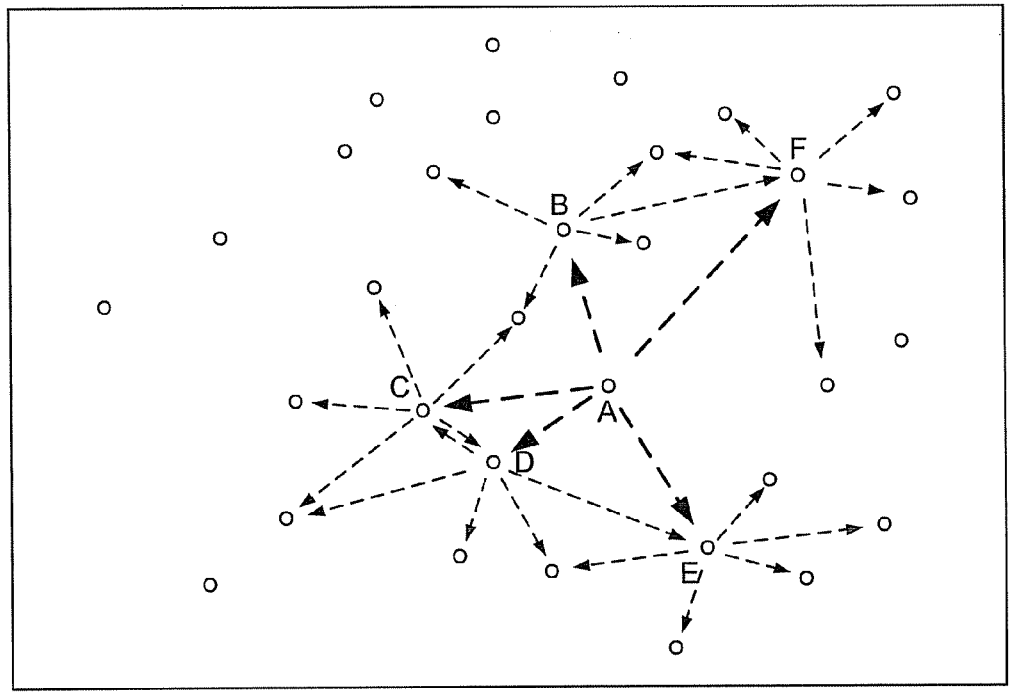
Figure 12:
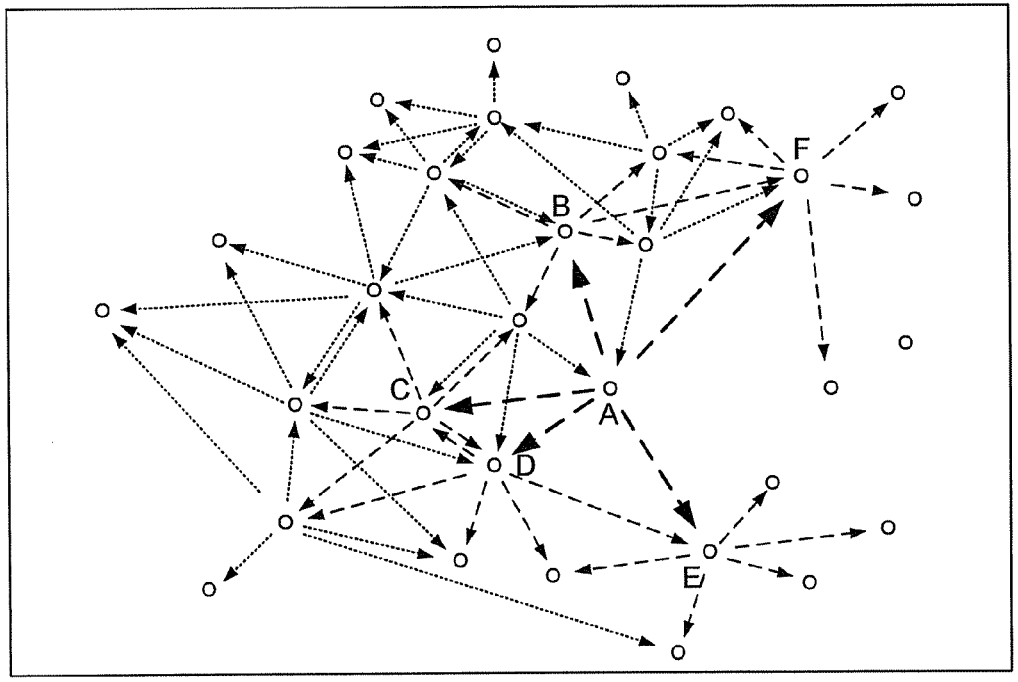
Figure 13:
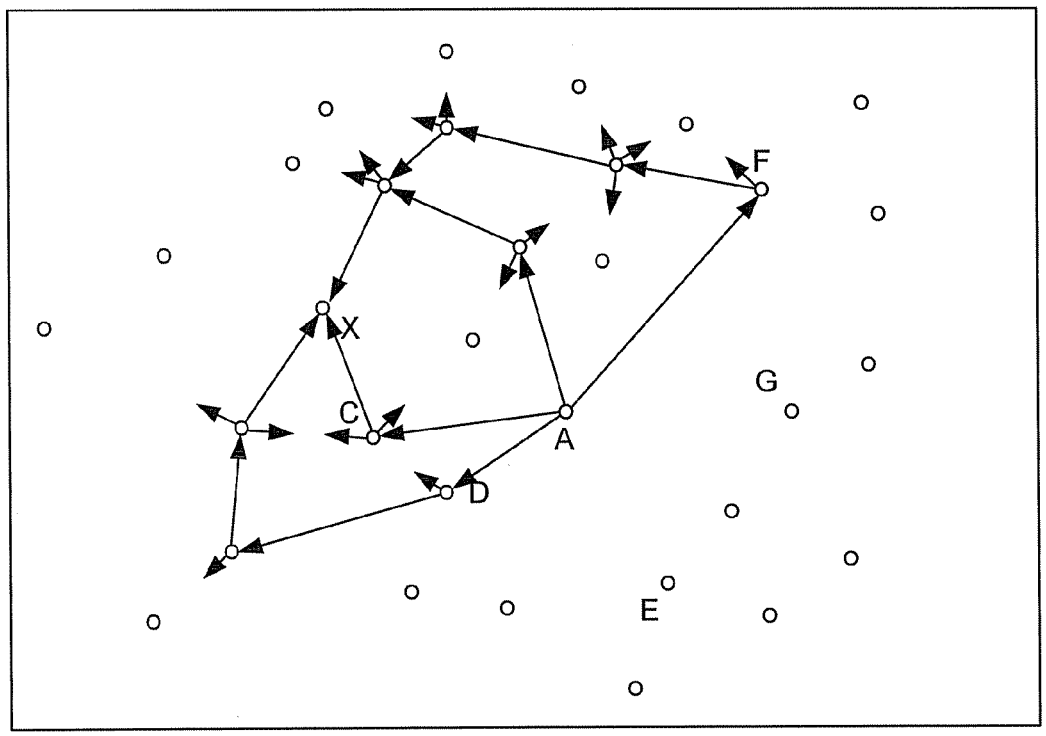
FIG. 13 is a schematic diagram illustrating the possible relay routing options between a source and destination station in the WLAN of FIGS. 9 to 12.

This concept is illustrated schematically in FIGS. 9 to 15. FIG. 9 shows a number of stations A to F in a WLAN region. Using basic ODMA over wireless techniques, station A collects and maintains 5 close neighbors (B-F). FIG. 10 shows a simplified top view of the radiation coverage at a particular moment in time during the probing. In FIG. 11, it is shown that A's neighbors have each in turn collected 5 neighbors (some of which are shared) and FIG. 12 shows the neighbors collected by the neighbors of stations B and C (obviously the neighbors of D, E and F will also be collecting neighbors, but for the purpose of clarity this is not shown). FIG. 13 shows that were a message to be communicated between station A and a station X, there are numerous routes that could be taken (and combinations thereof); four initial paths leaving A are shown, with each node along the way having various choices available to be made opportunistically.

Figure 14:
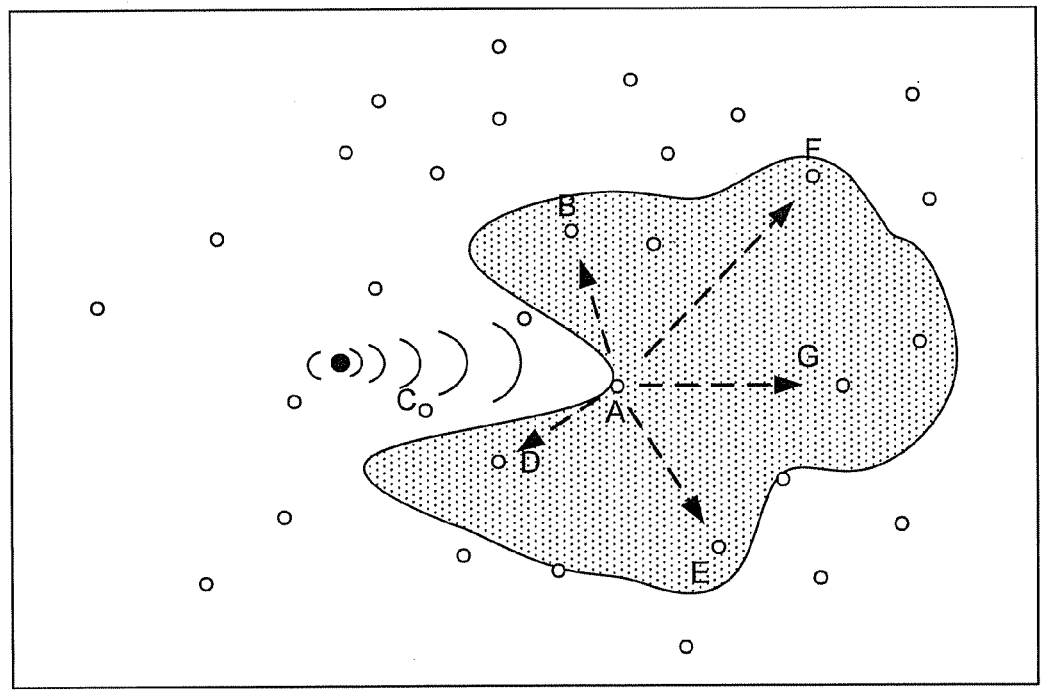
FIG. 14 is a schematic diagram similar to the diagrams represented in FIGS. 9 to 12, where a source of interference has been introduced in the WLAN affecting the coverage pattern of a station A that has directed a null at the interference.

However, if a source of interference is introduced to the network of FIG. 10, as illustrated in FIG. 14, the antenna on station A responds by directing a null in the direction of the inference source (as shown in the coverage pattern). As a consequence, station C is no longer visible to station A; and instead the slow probes identify G as a new close neighbor.

Figure 15:
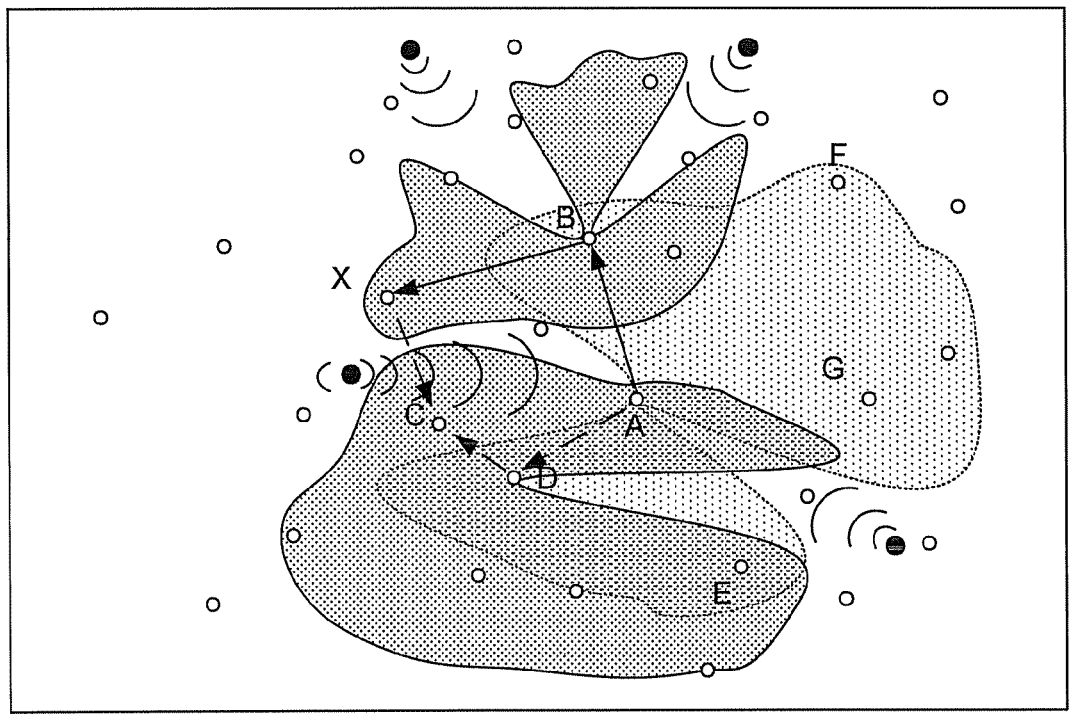
FIG. 15 is a schematic diagram similar to FIG. 14, showing additional sources of interference and illustrating the coverage patterns available at neighboring stations, enabling connectivity through relaying to stations that would otherwise be excluded from connectivity by virtue of the null.

In FIG. 15, several sources of interference have caused stations A, B and D to direct nulls in response (coverage patterns are shown for stations B, A and D respectively (from top to bottom on drawing) noting that the interference will not necessarily affect all the stations equally or at all depending on their strength, coverage pattern and the connectivity conditions at each station). Therefore, although A has no connectivity with X by virtue of the null steered at the source of interference, A can still send a message to X via B. A could also send a message to C via D; although it will be appreciated that X can communicate with C as well, despite the interference that affects A, as the interference is not affecting X or C. It should be noted that in a conventional system, even utilizing smart antennas, station A would not have been able to communicate with station C or X as such systems focus a one-to-one exchange. It is the ability to find a new path around the interference opportunistically which enables the interference problem to be overcome.

Another mechanism for avoiding the interference in an ODMA network environment is to utilize the auxiliary or macro site introduced in FIG. 3. If one or more of the antennas described above were hard-wired together, to provide very fast and reliable links, it would be possible to hop out of a wireless area with high interference, then hop through the wired connection onto an auxiliary link or network, and then hop back into the WLAN (bypassing the interference). Indeed, in cluttered environments at ground level, stations with the antennas described above could be located at the more cluttered ground level; such that certain interference could be nullified in order to receive a clear signal from the communicating station. The next hop could then be via ODMA over Ethernet and via a wired connection up the building to the rooftop high site where the next hop could be via an auxiliary network, such as ODMA over Internet; or the next hop could be wireless again on the same channel (for reuse of the channel resources) or on a different channel (for example, 802.11a instead of 802.11g used on the ground). In either event, the interference would be avoided.

This provides micro diversity between wireless stations (A-Stations in FIG. 4) at the ground level and macro diversity at the high site. It is envisaged that the wired stations will be access seed stations (B-Stations) with one or more stations having the antenna systems described, which in turn will be wired to concentrator stations (C-Stations). In the embodiment illustrated in FIG. 4, microwave links between the macro sites form a private connectivity cloud. The microwave links could be a private "Internet" (IP network) and/or could be connected to the Internet at large (confer Internet browsing). Even in a private Internet network private Internet addresses will be allocated to the stations which will all be required to report in to the Location Registration and Matching Server and the Authentication and Certification Servers. The ODMA over Internet methodology is described in International Patent application PCT/IB2006/001274 and is not only cheaper to deploy (being comprised of standard off-the-shelf components) than a wired network (such as Ethernet), but it is also more efficient in terms of capacity and throughput; as it is point-to-point and utilizes less resource overhead due to the "neighbors on demand" functionality.

Figure 16:
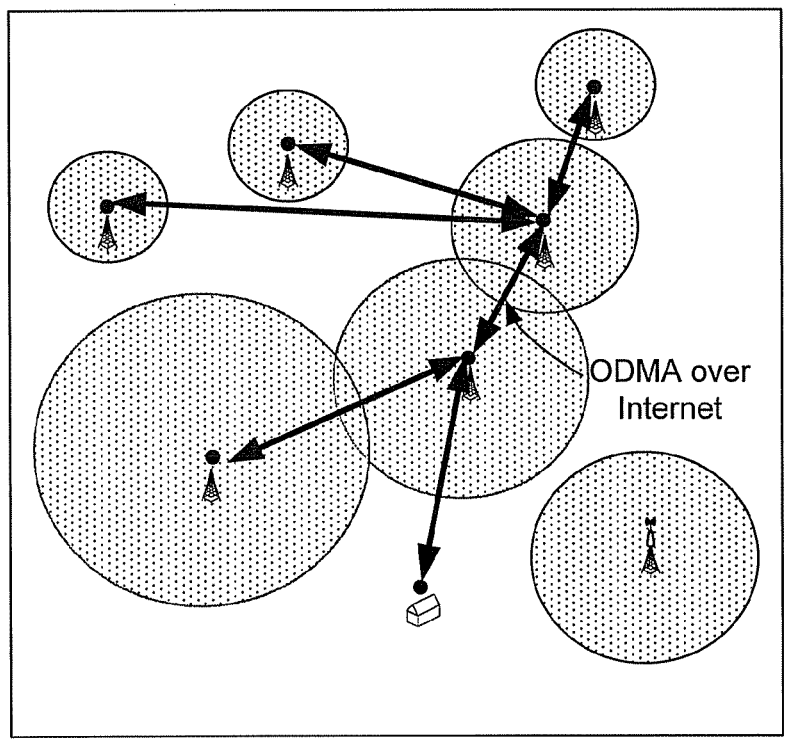
FIG. 16 is a simplified schematic diagram of a macro wide area network forming a private Internet auxiliary network.

FIG. 16 illustrates in a simplified schematic form the macro site wide area network, where access seeds are focused down in different directions to ground level and some may be positioned at ground level. Indeed, booster seeds may be used to relay from the macro site, off the roofs of houses nearer ground level, and then to relay into buildings (although this becomes less relevant as the subscriber density reaches the critical mass needed full indoor penetration). The macro sites may be connected to one or more other macro sites by wire or virtual wire connection.

Figure 17:
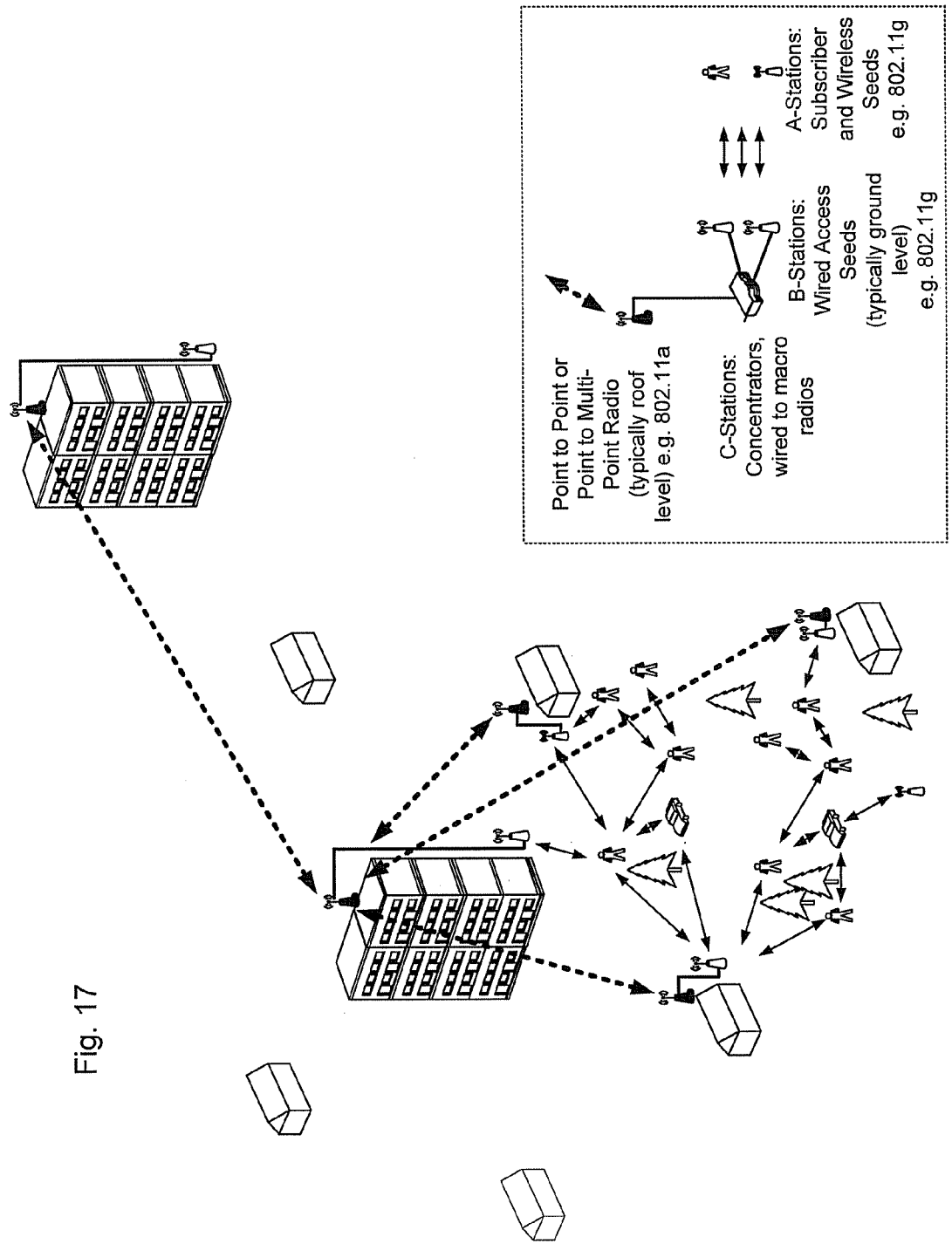
FIG. 17 is a schematic diagram of a portion of a network such as that depicted in FIG. 16.
Figure 18:
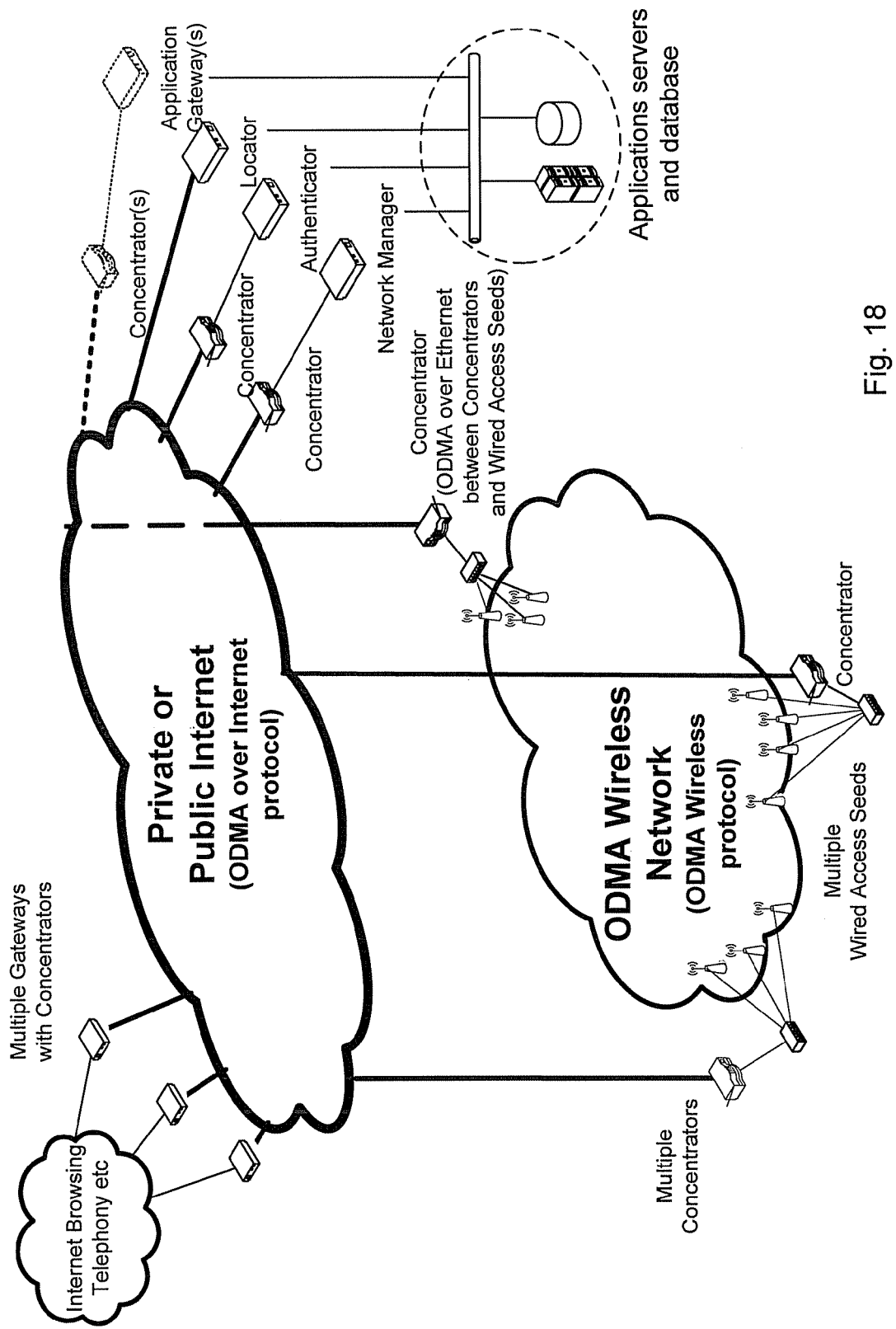
FIG. 18 is a schematic diagram showing the typical topology of such a network, comprising two tiers of connectivity.

FIG. 17 shows a portion of a network incorporating the abovementioned functionality; having a lower level (cluttered) ODMA wireless domain (A-Stations) in communication with access seeds (B-stations) that are typically located at ground level (although not necessarily). In the illustrated embodiment, the access seeds (802.11g) are wired through concentrator (C-stations) to the high site radios providing connectivity to the macro sites (through 802.11a). The macro sites are in turn in communication with other macro sites (typically by dedicated point-to-point channels). FIG. 18 shows the topology of such a network, comprising two tiers (levels) of connectivity, with the upper tier (forming the optimized central auxiliary network) raised out of the clutter using optimized connections.

In the embodiment illustrated in FIG. 17 the connections are "virtual" wire point-to-point directed wireless connections, but these could be any point-to-point connection such as optical fiber microwave etc. The wireless and auxiliary networks are connected together via concentrators, which have the ability to communicate in the different ODMA protocols (Wireless, Ethernet and Internet; which may each utilize specialized opportunity driven data transport mechanisms). In this manner, because the upper tier is highly optimized, high performance connectivity can be expected and this enables very high rates of throughput capacity to flow through the "wired" tier. Stations in the wireless clutter need only route through 1 to 4 hops (or so) to reach a site having connectivity to the upper tier, or the routing can still be effected wirelessly over more hops if needed. However, because the stations are not dedicated to a single concentrator for access to the IP tier, being able to hop wirelessly to others that may be accessible, routing can take place over the best paths available at any time.

It should be appreciated that the "wired" auxiliary part of the network is not necessarily the Internet backhaul as such (although it could be). Management servers required to operate the network, and the gateways to applications, connect through the auxiliary network and may be located remotely relative to the wireless parts of the network, which in turn may be connected all around the world. Moreover, as the gateways and network servers may be placed anywhere having connectivity to the auxiliary network layer, redundancy is built in and subscriber devices will have the ability to choose available gateways opportunistically.

Alternatively, in smaller scale systems for a discrete WLAN over a large area, it is possible to arrange the 802.11 a-band and g-band stations of FIG. 17 with a back-to-back wire connection directly. This would enable wireless users to route through a wired seed on the g-band which could hop through the wire to a station on the a-band, then on to high sites on the a-band, making very large and efficient hops over multiple high sites as needed, before returning to the g-band.

Figure 19:
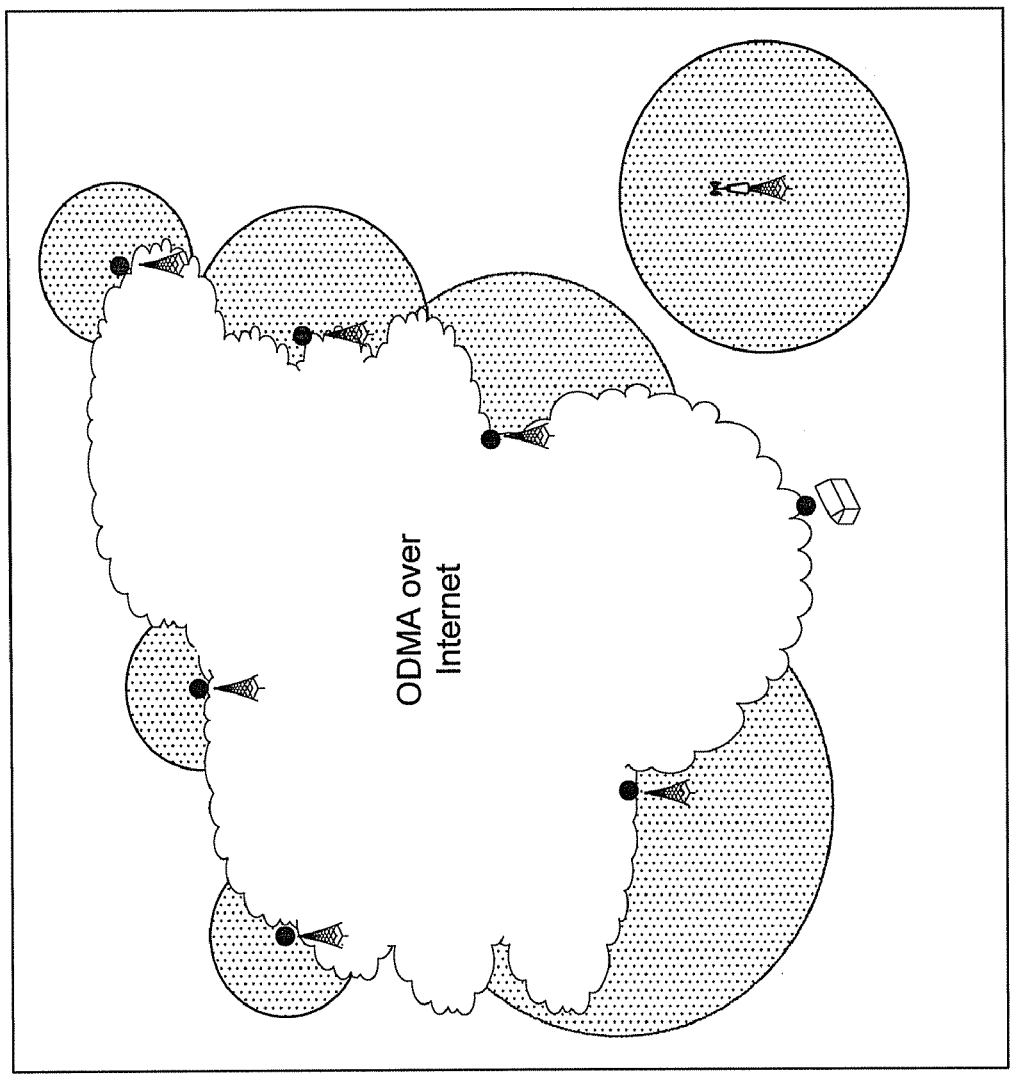
FIG. 19 is a schematic diagram providing an alternative representation of the network illustrated in FIG. 16.

FIG. 19 shows that the point-to-point nature of the macro links of FIG. 16 effectively forms an amorphous network cloud of connectivity (just as the Internet at large does in more comprehensive scale). The cloud can be extended by adding more links between the macro high sites and the boosters.

Figure 20:
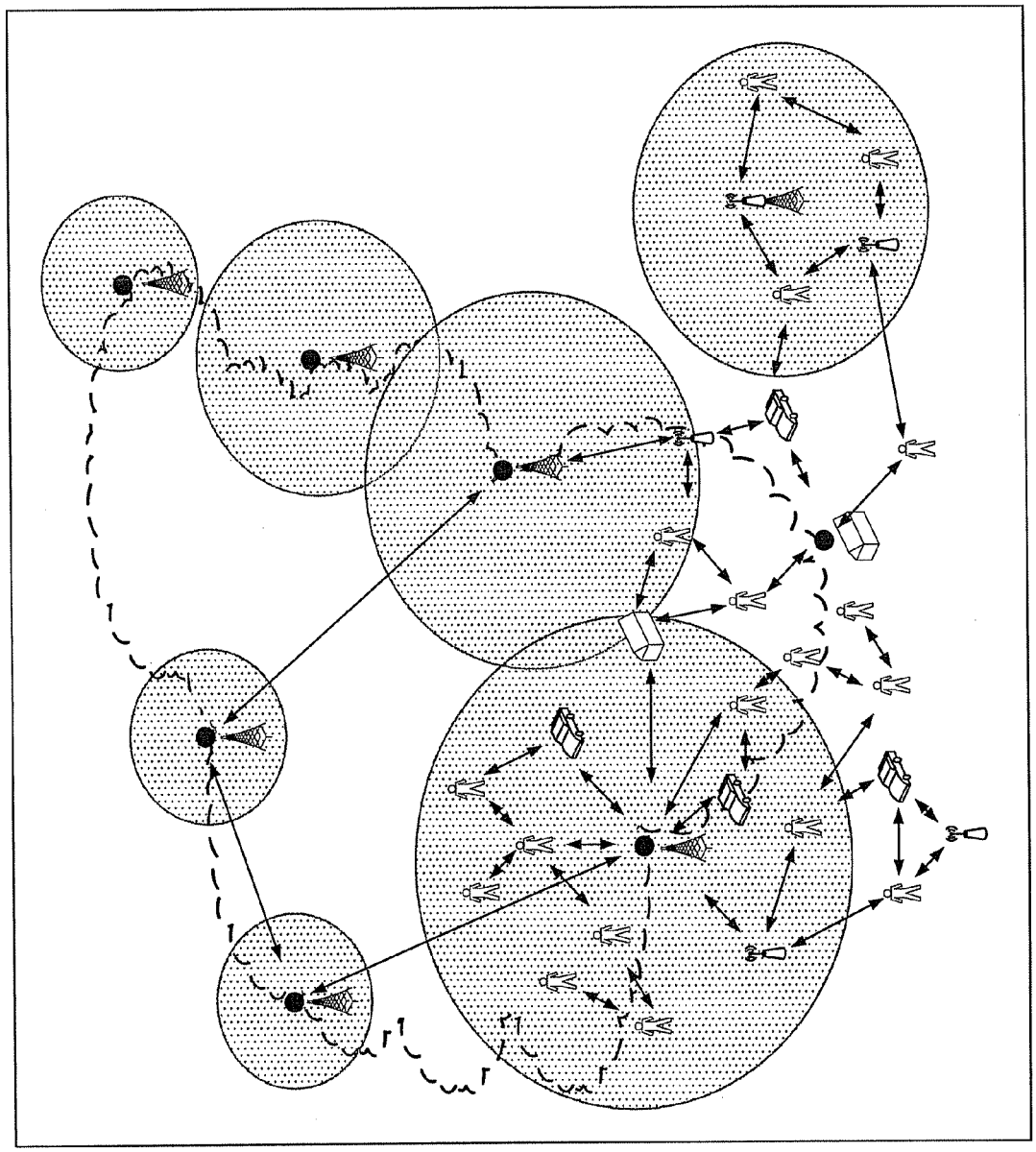
FIG. 20 is a schematic diagram of a micro ODMA WLAN operating in conjunction with the macro network illustrated in FIGS. 16 and 17.

FIG. 20 shows the wireless ODMA activity in selected areas of macro coverage. Not only does the macro system create additional diversity by providing access to an auxiliary network, but it will be seen that ODMA over wire operates on a micro and macro level as well. By nullifying interference at the high sites, it may be possible to take very long ODMA over wire hops between the macro sites (in addition to or in combination with the wire or virtual wire connections) and to subscribers and seeds below, thereby further increasing the diversity.

It should also be appreciated that where two or more ODMA units or stations are connected (wired) together back-to-back, then assuming there is sufficient isolation between the beams of the two systems, the combination will be able to transmit data that has been received almost immediately upon receipt which reduces the delay of relaying. Isolation can be achieved using different channels, or by increasing the physical distances between the stations, or by one or more stations adapting its beam patterns and steering nulls at each other. This enables increased channel re-usage and increases throughput and efficiency.

Beam forming can be achieved by three broadly defined mechanisms. A single beam can swivel around an area through defined scan positions, dwelling at each position for a predetermined period. This is termed "scanning" and is not particularly efficient as while the beam is locked into a position it may miss opportunities in other positions. In an ODMA context this will create opportunities, but the collected neighbors will not be stable (depending on the narrowness of the beam).

A multi-beam approach increases the complexity but provides enhanced sensitivity in respect of the receiving capability and narrow beams can be used for transmission which is very fast and efficient. An omni-beam or broad beam approach involves monitoring broadly and converging on a point when appropriate. This mechanism would utilize the RTS/CTS mechanism, but suffers from the same issue as the scanning approach in that other opportunities might be missed while focused.

However, the scanning and omni-beam limitations can be mitigated if two or more units are wired together (as a single combination unit or as independent devices), in which case one station could monitor broadly for neighbors, while the other converges as needed. Obviously, two or more receivers are required for this approach, but if there are two or more transceivers the combination can probe and transmit simultaneously.

The benefit of having the stations separated is that the station monitoring broadly could be placed at an elevated location (such as the roof) while the other scans and communicates lower down (in the cluttered street level, for example). Such systems can be differentiated from conventional sectorization techniques as the stations located are monitored broadly, but the stations and the beam patterns utilized are chosen and adapted opportunistically at the moment to transmission.

At the upper level the two main factors leading to opportunities will be interference (from outside sources and generated from the network itself) and traffic load.

The amount of data flowing across the network will effectively load the network dynamically; and as the station buffer size may be utilized in the calculation of the cost function, the variations in load will effectively produce opportunities as transmissions of data flow across the network. As more data flows, the network itself will begin contributing to the interference experienced in other parts of the network; and this will also need to be avoided through the switching of channels and antennas by the selection of radios described below.

At the upper level "clusters" of radios may be provided on any high site, which are typically connected together with ODMA over Ethernet. The radios may each be operational on a different channel, or scanning for channels free of interference; consequently, these radios are in effect creating a multi-beam and multi-channel environment and, as such, will experience different levels of interference on the different beams and channels.

The interference conditions may be accounted for in the cost function applied in the fast probe and can be opportunistically detected, as this information is included in the probes and is used by other stations in evaluating the cost. Even where a faster, simplified data transport protocol is applied, that does not utilize the channel switching and opportunistic selection at the data transport level, the multi-beam and multi-channel features provided by the cluster of radios will effectively produce an adaptive opportunistic environment; because the ODMA over Ethernet and the fast probing and slow probing will redirect the traffic load onto the different radios in the cluster as their cost functions change, as detected by slow probe and fast probe mechanisms.

The result is that the data will still be directed opportunistically to more optimal radios, and to the associated channels and antennas, even where the more powerful and robust data transport protocols are not used. In these circumstances opportunities will predominantly be detected through the fast probe and slow probe processes and the data will still follow opportunistic routes from each high site (cluster) to other high sites (clusters) as the variations in interference and traffic load cause changes to the cost functions. The load of data, and buffer size of accumulated data, can also be used in the selection of the radio in the cluster chosen for use for the next hop, as this information can be included in the cost function and then detected as part of the fast probing. This will compensate for the simplified data transport.

The use of a simplified (and more fragile) data transport protocol at the upper layer allows faster data flow under good conditions between any two stations' and providing the path is good and the system gain is sufficient this will be reliable. However, interference and noise will ultimately make any single link unreliable and the effective data rate will consequently fluctuate. The use of opportunistically selectable options using a cluster of radios with different beam patterns, or on different channels, or located in different parts of the building or cell tower, allows the interference to be avoided. In these circumstances, a null is effectively provided in the direction of the noise or interference by using the building to shield the interference, or due to the beam pattern of the antenna etc. The data will potentially need to follow different opportunely chosen paths within clusters, and from cluster to cluster, and if necessary the path may include more hops to reach the destination cluster. In this way, the cluster to cluster multi-hop path can be made very reliable and more immune to interference, while still maintaining high throughput due to the faster data transport. In these circumstances, the opportunities are being detected within the cluster, as opposed to at each radio in the cluster. Each radio in the cluster will still be able to choose which neighbor to use opportunistically, but this will be mainly at the fast probe and slow probe level.

Figure 21:
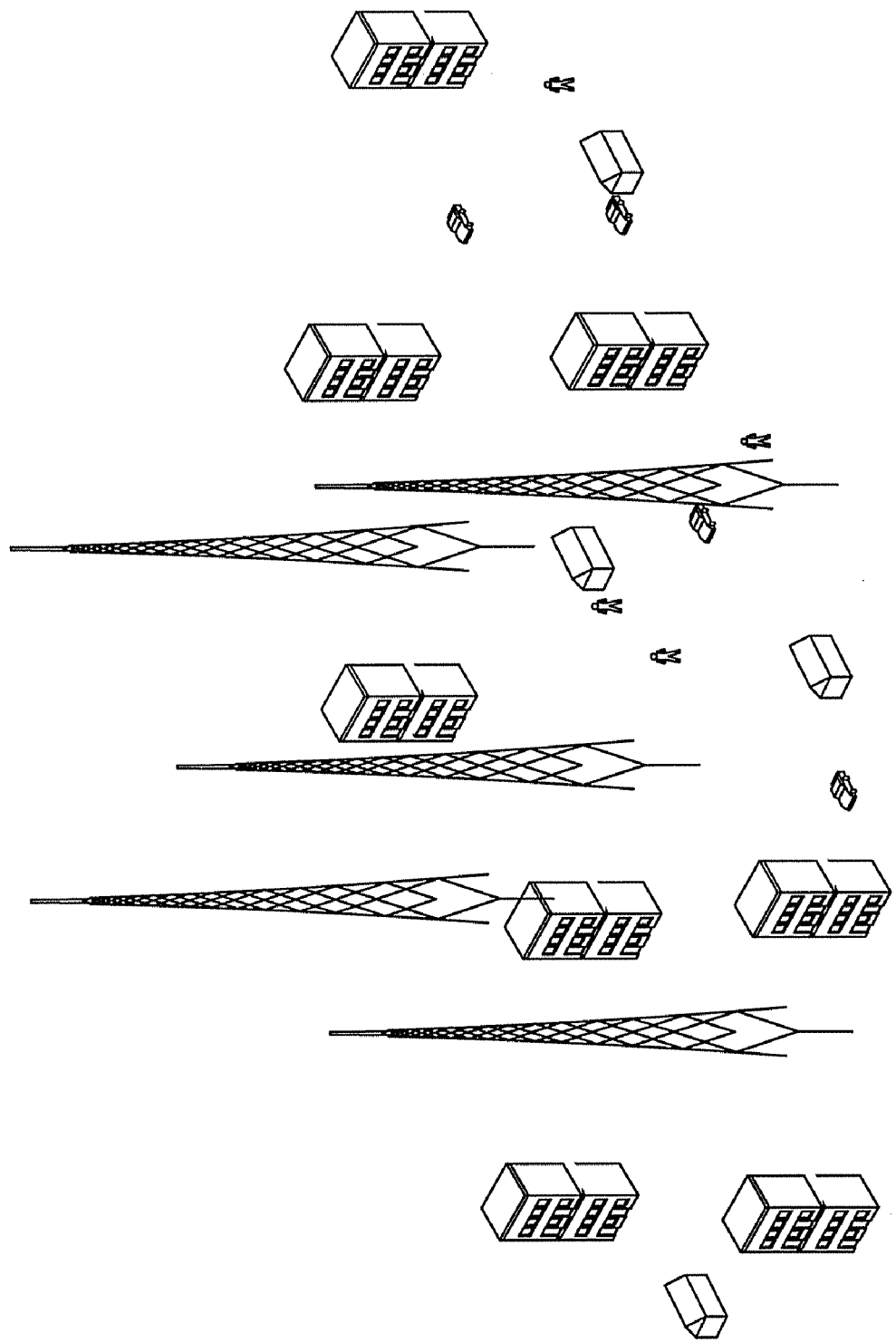
FIGS. 21 to 28 are schematic area and connectivity diagrams of a simplified urban environment with buildings and pre-existing cell phone towers for a network deployment in accordance with another embodiment of the invention.

FIG. 21 shows schematically a simplified urban environment with buildings and pre-existing cell phone towers in accordance with another embodiment of the invention. In addition to the two tier network deployment described above, it is possible to deploy multiple tier architectural topologies in such an environment. Using sites located well above the clutter (masts, towers or tall buildings) it is possible to provide very high speed and high throughput transmissions over high gain antennas (pointing at each other as directional antennas or as sectored and/or narrow vertical beam systems) between these sites. These antennas may only have sight of one or two other sites, but by providing different directions and channels each site may be able to form a mesh network with multiple similar stations.

Figure 22:
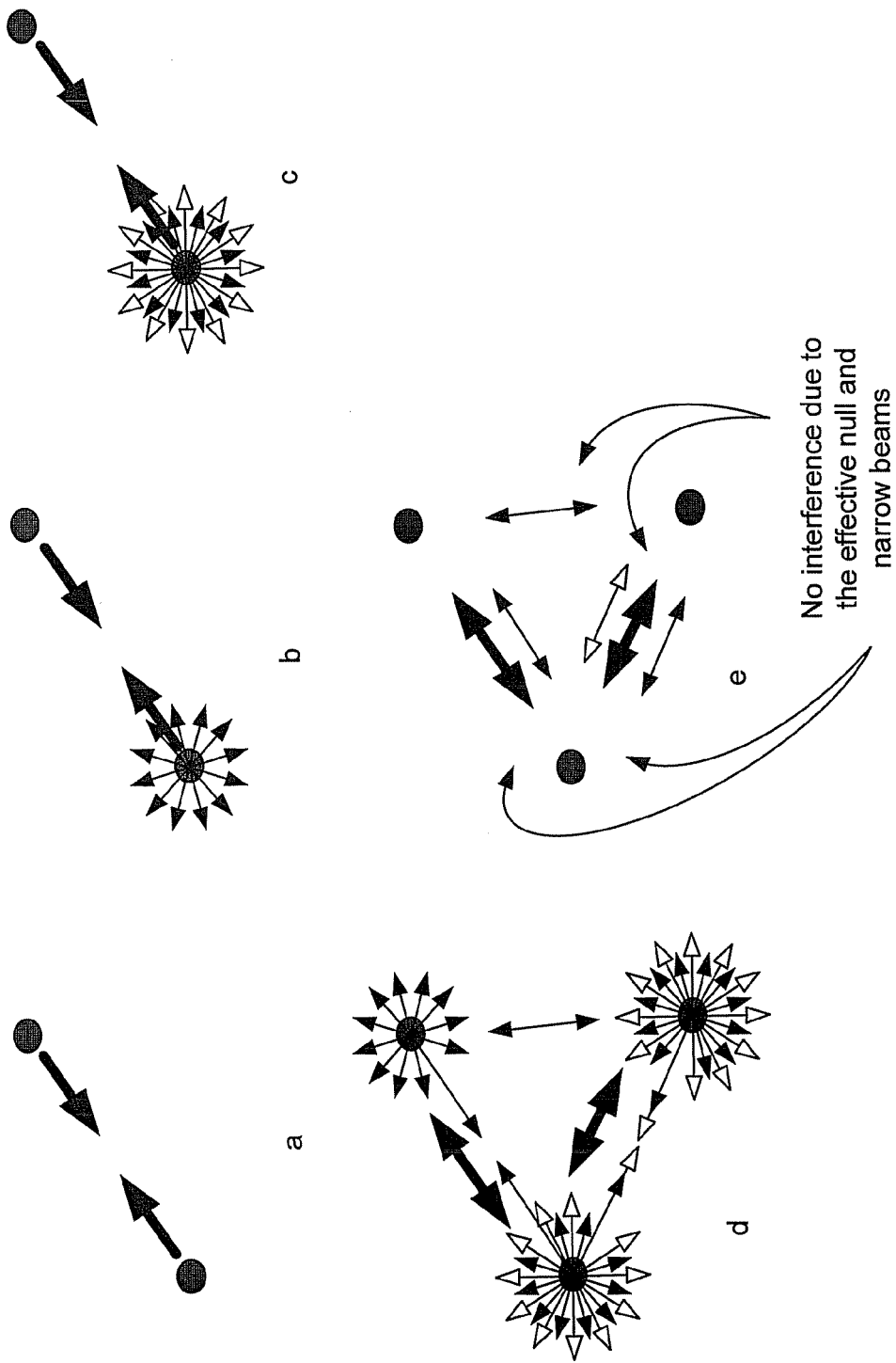

In FIG. 22 (*a*), a dedicated point-to-point directed antenna link is shown between two stations. In FIG. 22 (*b*), a narrow vertical beam (360 degree) multi-beam antenna has been added. The antenna may be a multi-beam antenna, in which event if monitoring takes place on multiple beams many receivers would be needed to be active at the same time, or the antenna could be a switched beam antenna (with one radio) as shown in FIG. 6. In any event, at least one new separate radio (and therefore a second channel) is available. In FIG. 22 (*b*), it is more appropriate to deploy a switched beam antenna. In FIG. 22 (*c*) a third channel has been included.

Three stations in communication with each other are depicted in FIG. 22 (*d*), and the available channels between the stations are represented in FIG. 22 (*e*). The additional antennas in FIGS. 22 (*c*) and (*d*) would more appropriately be multi-beam, multiple receiver/transmitters as there is more connectivity. By forming a single, narrow beam on the various channels, a null is effectively created elsewhere which prevents interference.

Figure 23:
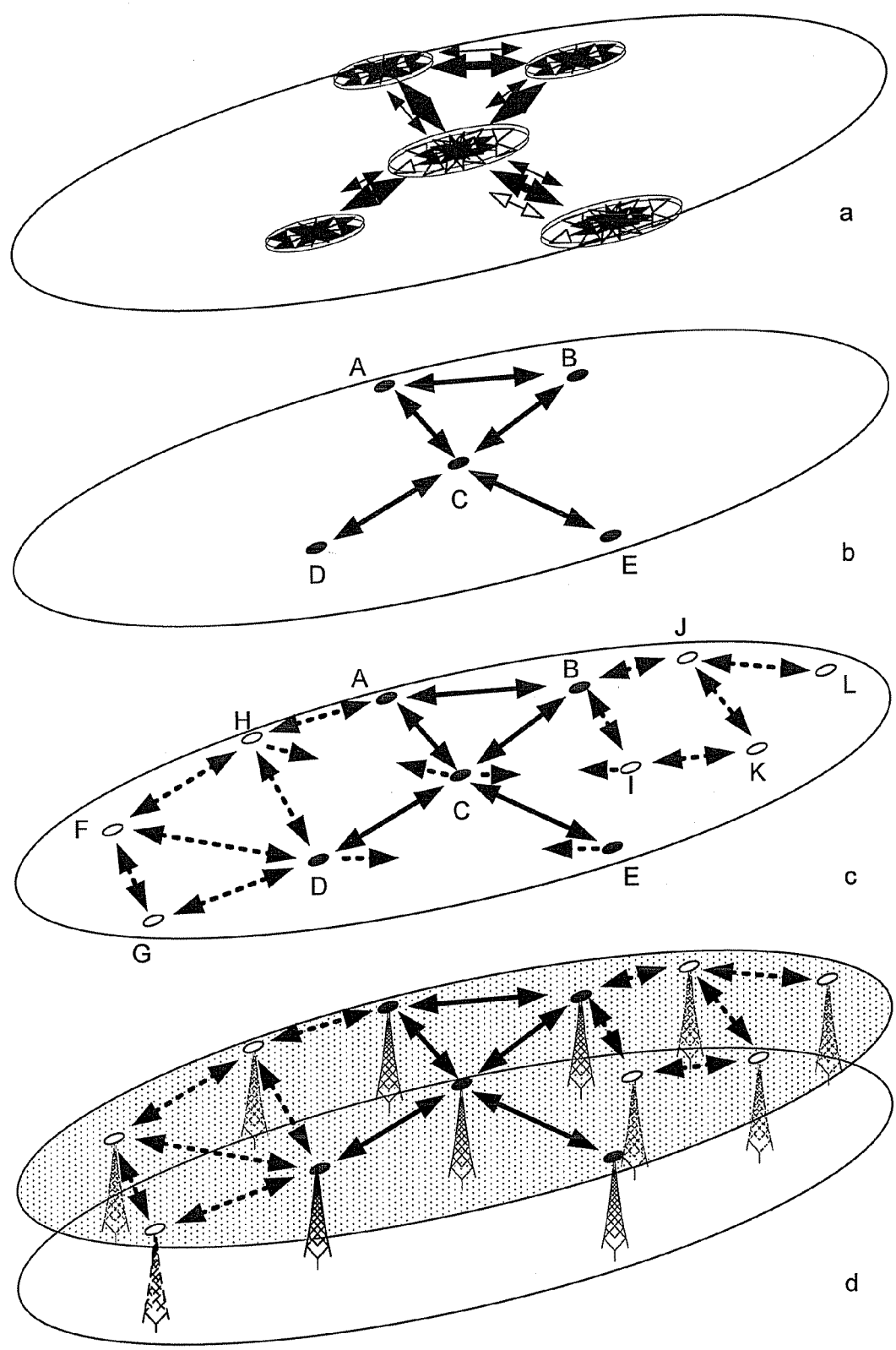

Similar stations are represented in FIG. 23 (*a*), showing the channels and nature of the narrow beam and dedicated high gain links; and this connectivity is simplified in FIG. 23 (*b*). In FIGS. 23 (*c*) and (*d*), where other similar stations with connectivity on the network are depicted (but not contemplated in the following description) the stations are located at the top of towers or other very high sites. This upper level in the illustrated embodiment is typically operating in 802.11a, where multiple orthogonal channels are available and the interference between them is reduced through the separation. These stations will probe and discover other stations on the upper level and mesh together, enabling very high throughput (10s of Mbps) over great distances (5-10 km due to the line of sight, high gain antennas).

As depicted in FIG. 22 (*e*), if a receiver is blocked or experiences interference, the channel could be switched and a null steered in the direction of the interference (for example a black arrow replaced by a white arrow). By virtue of the nulls and focused beam, opportunities will automatically be created as traffic loading fluctuates and probing results are affected. It must be appreciated that even with the more structured levels of communication, the communications are still very much opportunistic in nature by virtue of the large fluctuations in interference that are present; but there is no attempt to optimize on any specific route or establish predetermined routing. However, the upper levels of network will still be stable relative to ODMA over wire conditions at the lowest level as there are fewer neighbors and the links between nodes are more stable. This allows the use of the faster but less rugged data transport protocols.

In FIGS. 23 (*b*) and (*c*), it will be appreciated that even with narrow beams it may be possible for the nodes to cause interference with each other, but by selection of alternative beams the interference can still be avoided by steering nulls and gains effectively. For example, towers 1 and 3 could be in communication on one channel, at the same time as towers 3 and 5 are attempting to communicate. As the three towers are positioned nearly in a straight line, transmissions from tower 1 may interfere with the reception at tower 5. Indeed, if the link between towers 1 and 3 is operating well, it will be undesirable to prejudice the connection. One solution is to change the channel of one of the links; but there is another solution that enables channel reuse.

In order to communicate with tower 5, tower 3 could instead send data via tower 4 for example (which by virtue of the narrow beam can avoid sight of towers 1 and 5 on the channel). The data can then route to tower 5 via tower 6, or tower 4 might be able to establish tower 5 as a neighbor. Avoiding any interference in this manner, by choosing discrete beams in directions that do not point at other towers, facilitates optimal traffic reuse.

Figure 24:
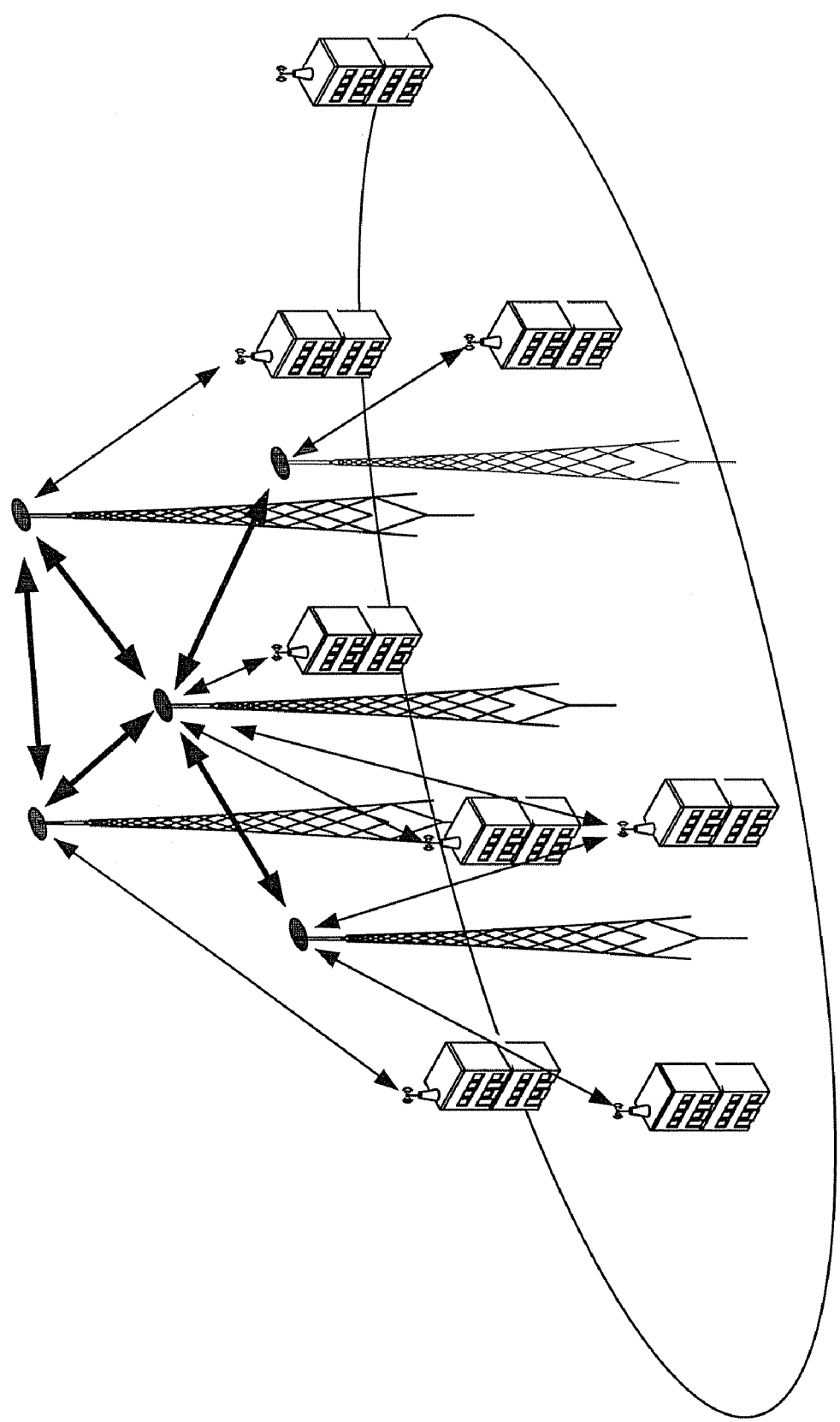
Figure 25:
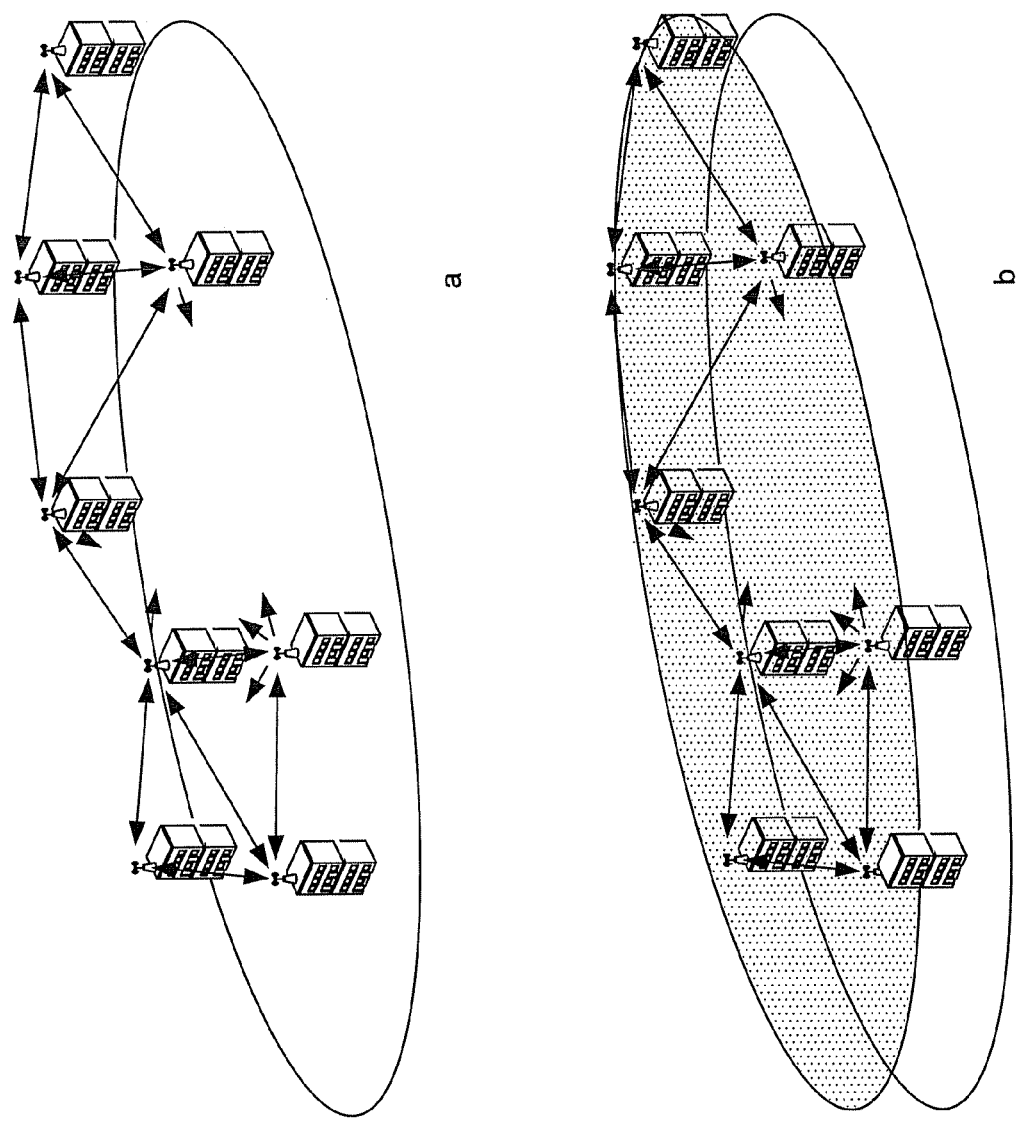
Figure 26:
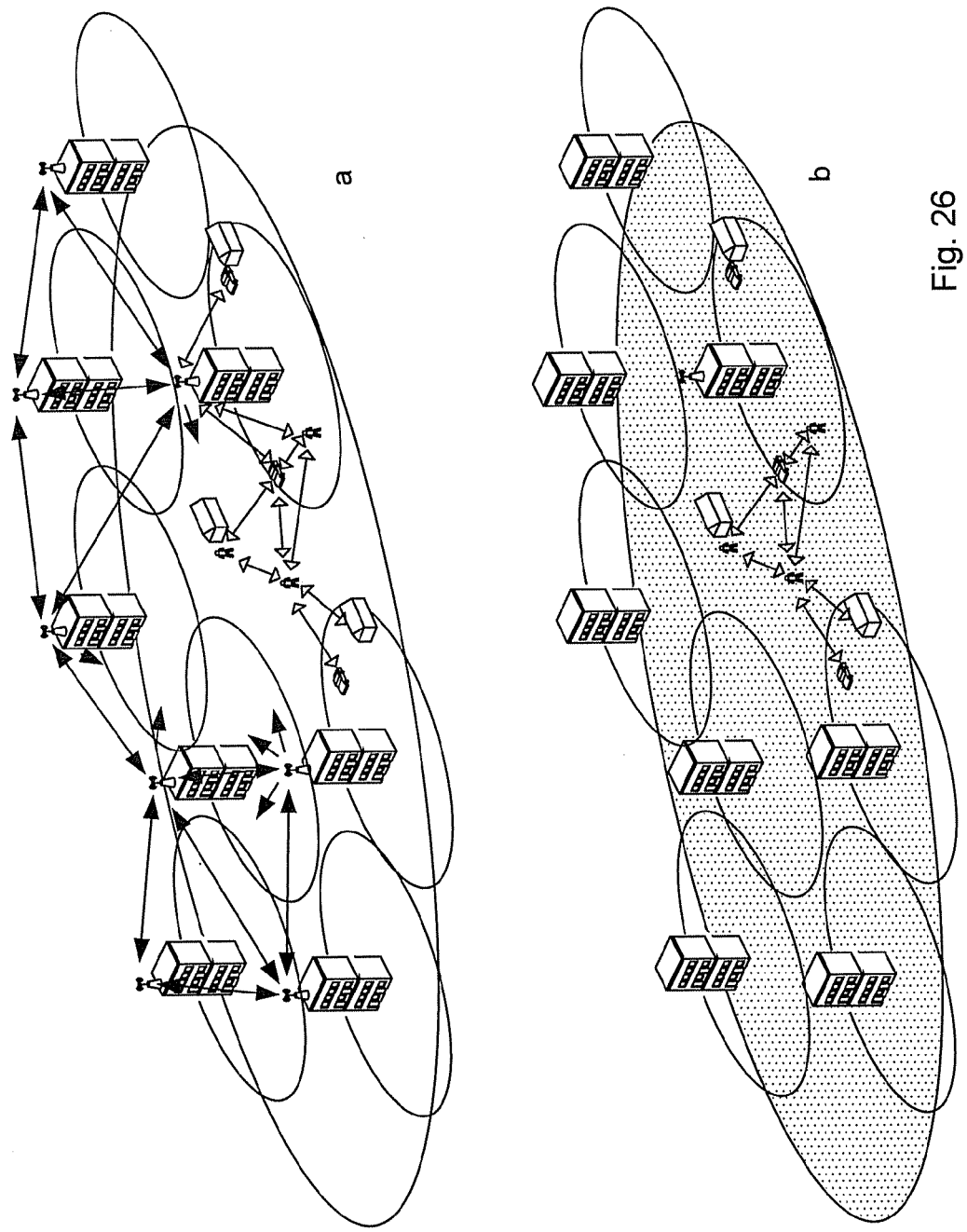

Beneath the upper level is an intermediate level, as depicted in FIG. 24, where stations located on high sites are in dedicated connectivity with one or more of the stations on the upper level. In the present embodiment, this is through a directed high gain antenna on the 802.11a band with line of sight. In FIGS. 25 (*a*) and (*b*) it can be seen that the stations may also have relatively narrow vertical beam antennas, or directed or sectored antennas operating horizontally to enable the intermediate level stations to mesh with each other (probing and discovering neighbors). The stations on the intermediate level also have antennas (operating on 802.11g) directed downward towards the lower, cluttered level (typically street level) as shown in FIG. 26 (*a*) and (*b*). The a-band and g-band stations are typically hard-wired to each other using ODMA over Ethernet, enabling the g-band stations to be located on the roofs, or at street level as desired.

Figure 27:
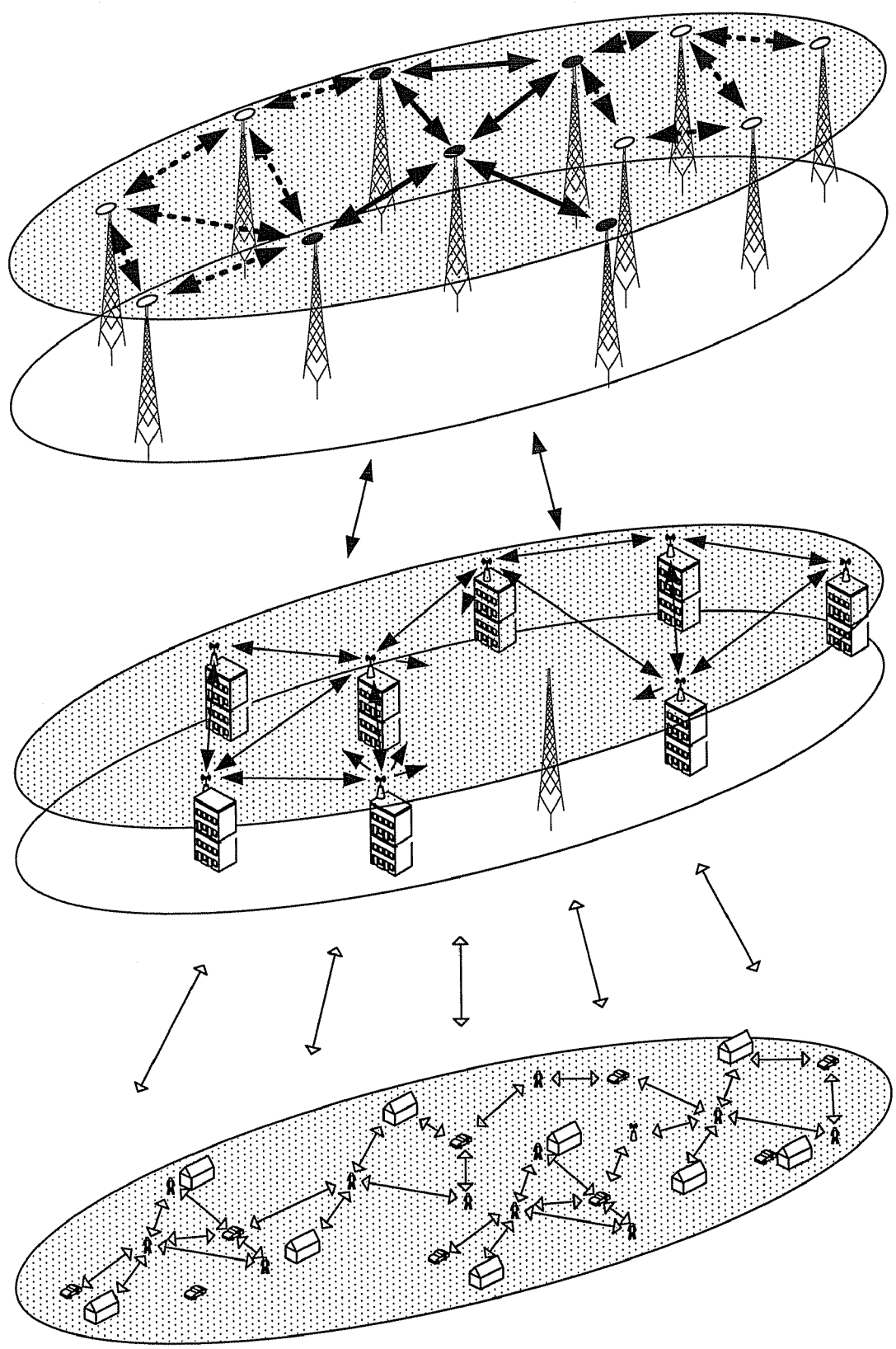
Figure 28:
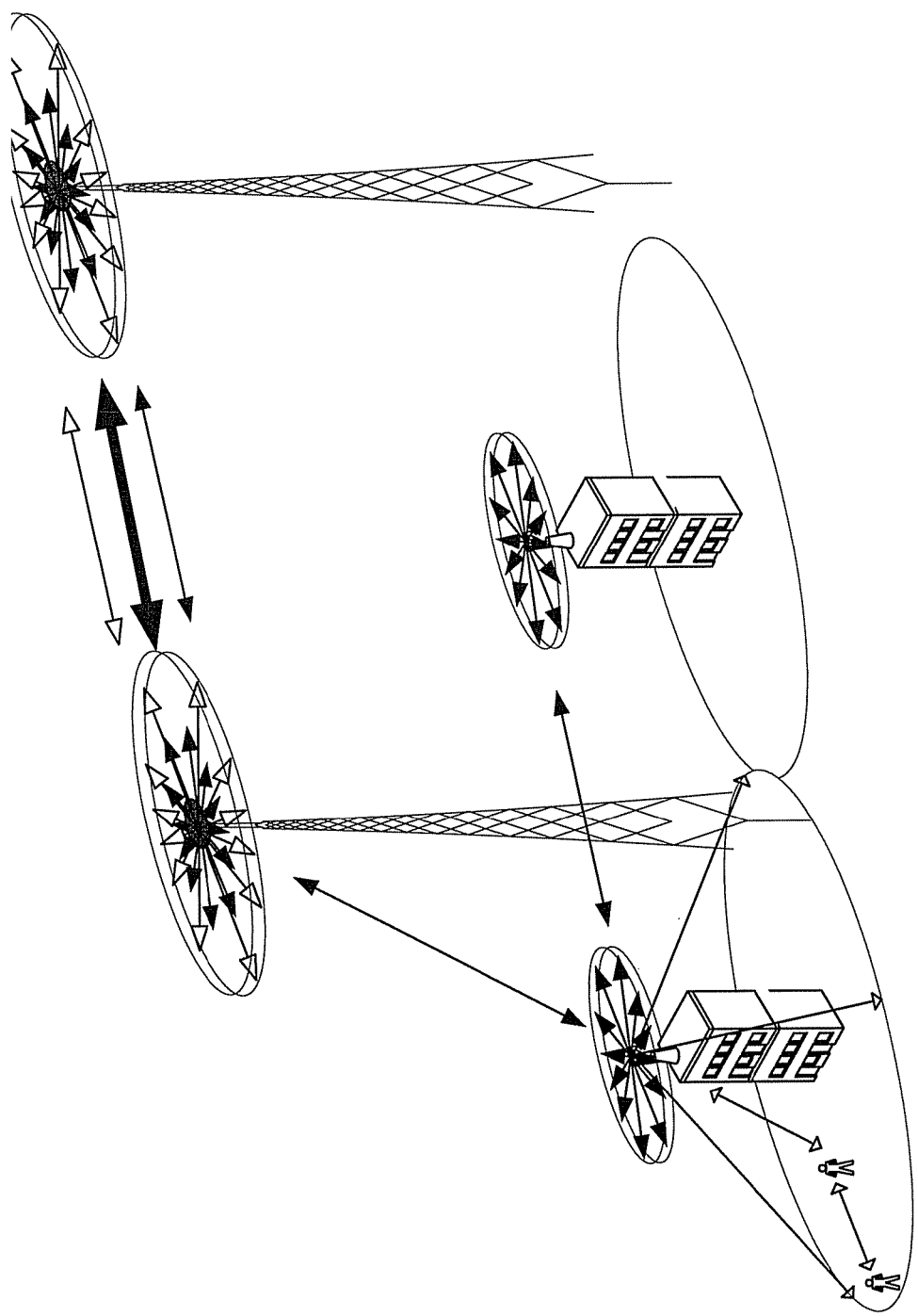

The three distinct levels, with interconnectivity, are shown schematically in FIG. 27, and a more detailed breakdown of connectivity is depicted in FIG. 28. In the upper level links may be available on a cluster of different channels and are highly optimized, with dedicated directed antennas or narrow vertical beam antennas with excellent line of sight. Typically the stations scan all the channels available and determine one or more channels that are appropriate. One channel is likely to be maintained as a fixed channel for the transmission, but more may be used in parallel, for redundancy or for load balancing as appropriate.

Multiple transceivers may be provided in the cluster, linked by ODMA over Ethernet, and still produce fixed beams as depicted in FIG. 6 by joining up the clusters; where traffic is automatically received on one beam, sent over ODMA over Ethernet, and then transmitted out of other beams or antennas. These links are obviously less rugged than normal ODMA over wireless, but due to the optimization the channels are highly efficient. Peaks of opportunity are available due to the interference, noise and fluctuations in path loss, leading to peaks and troughs as antennas are switched and different channels are used. Diversity is available by virtue of the channels available, and the availability of other stations in the mesh to relay. Spokes of connectivity are directed down from the upper level to the intermediate level, using dedicated, directed antennas with high gain. A number of antennas could point down to the next level, or substantially horizontally on the same level, to provide diversity in the same way.

At the intermediate level, the same high speed data transport protocol is used as in the upper level. The stations at this level are typically on mid-level buildings, and have a-band connectivity to the upper level, and g-band connectivity (wired to the a-band radio) to reach the lower level. The radios may also mesh with other stations on the intermediate level, although a clear view to other sites may not always be available. The g-band radios (B-stations) are typically attached via concentrators (C-stations) to the a-band radios as previously described.

A message from the lower wireless level may be routed from the intermediate level directly to an upper level station, or through several intermediate level stations to an upper level station, or may remain at the intermediate level before returning to a lower level destination. The diversity is consequently available on both the upper and intermediate levels by virtue of the multiple high sites and tower sites available, without necessarily needing to change channels. This enables use of the high speed data transport protocol, which may simply consists of DATA/ACK exchanges on the dedicated one or more channels identified (which are optimized).

Although fast probes may be passed through the upper layers, the high speed data transport on the intermediate and upper levels may reduce overhead by limiting the utilization of the fast probes to the lower level (to locate the concentrators available). The neighbors on demand functionality over the ODMA over Internet also minimizes traffic load over these channels.

A possible example of a network architecture and deployment of a multi-level system is more fully described in Appendix B.

APPENDIX A

ODMA (Opportunity Driven Multiple Access)

An ODMA multi-station network comprises a number of independent stations, which may be fixed or mobile, each of which can transmit and receive data in order to transmit messages from originating stations to destination stations opportunistically via intermediate stations. In order for an originating station to be in a position to send a new message to a destination station via a selected one of several possible intermediate stations, each station must at any time normally be in contact with several other stations. This applies also to the case where stations are required to relay a message from an originating station to a destination station.

In order to do this, each station selects one of a number of possible probing channels to transmit probe signals to other stations. The probe signals contain data identifying the station in question and include details of its connectivity to other stations. Other stations receiving the probe signals respond directly to the probing station or indirectly, via intermediate stations, thereby indicating both to the probing station and other stations their availability as destination or intermediate stations. The probing station evaluates the direct or indirect responses to identify other stations with which it can communicate optimally.

The above described method of opportunistic data transmission between stations of a network is referred to as Opportunity Driven Multiple Access (ODMA) and the principles can be applied over any packet switched network.

ODMA Over Wireless

The ODMA-over-wireless methodology is used in a communication network which has a number of wireless stations which are able to transmit data to and receive data from one another. The methodology comprises defining a first probing channel for the transmission of first, broadcast probe signals to other stations. These probe signals can also be referred to as neighbor gathering probe signals. Other stations which receive the first probe signals (also referred to as "slow probes") from a probing station indicate to the probing station their availability as destination or intermediate stations (i.e. as neighbors of the probing station). A neighbor table comprising details of, and connectivity data relating to, these other available stations is maintained at each of the stations.

In an ODMA network utilizing a wireless medium, when there are a number of stations in close proximity they will end up probing at higher data rates and lower transmit powers. Listening stations will occasionally respond to stations that are probing at the lower data rates, or that do not have enough neighbors, to help any lonely (distant) stations (also referred to as "lonely neighbors") that cannot use the higher data rates or do not have sufficient neighbors. Stations will only use the lower data rates when they are lonely and cannot find sufficient neighbors at the higher data rates and at maximum power.

ODMA networks typically utilize two kinds of probing processes, "slow probing" and "fast probing". The slow probing process is used by each network station to gather neighbors, while the fast probing process is used to construct gradients between originating and destination stations.

Each station will transmit slow "neighbor gathering" probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power.

Each station will randomly vary the Slow Probe Timer slightly between slow probe signal transmissions to avoid collision with other stations. Should any station start receiving another station's transmission, it will reload the Slow Probe Timer with a new interval.

In a wireless network of mobile stations the stations are constantly moving, and as such the number of neighbors will constantly be changing. If the number of neighbors exceeds the required number, a station will start to increase its data rate on the probing channel. It will continue to increase its data rate until it no longer exceeds the required number of neighbors. If it reaches the maximum data rate it will start to drop its slow probe transmit power by small increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels. When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

When a station changes to the Data Channel it loads the Data Timer. It will remain on the Data Channel for as long as the Data Timer will allow. When the Data Timer expires the stations will revert back to the Probing Channel and start probing again.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors.

Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor are stored in the neighbor table kept at each station. If a neighbor is no longer heard then the path loss and power level required to reach the station are increased or "ramped" in the table until a certain level is reached at which point the neighbor is removed from the neighbor table.

If a station has a message (or other data) to transmit to a station that is not one of its neighbors, for example, a distant station across the network, it begins to transmit fast probe signals (or gradient gathering probe signals) to develop information on how to reach that station. The information is called a gradient and is an indication of the cumulative cost to reach a destination station. When a station starts to fast probe it indicates that it is looking for a destination and neighbors hearing the fast probe will themselves fast probe until the destination station hears the fast probes of its neighbors. The gradient is then built through adding cumulative cost until the gradient reaches the source, and the source can commence to send messages to neighbors using the information developed in the gradients to destination, which in turn can send them to their neighbors until the destination is reached.

Each station keeps a record of the (cumulative cost) gradients to each destination of each of its neighbors, and its own gradient to the destination. In standard ODMA communications, each station only passes messages to stations with a lower cumulative cost to destination. A station can pass a message to any of its neighbors with a lower gradient to destination. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages/data needs to be sent to stations that are not neighbors.

Each wireless station uses the slow probing process to identify and obtain information from the station's neighbors. A station is considered a "neighbor" in this sense if it has been heard to transmit a neighbor gathering probe message, and details of the neighboring stations identified will be maintained in each station's neighbor table.

If an identified neighbor has itself transmitted a neighbor gathering probe message that is received by a particular station, and the probe contains information of the particular station's own identifier, then the neighbor is flagged as a "detecting neighbor" in the neighbor table. Typically each station will adapt its neighbor gathering techniques (generally by increasing data transmission rates and by powering down the strength of the probe signals sent out) to maintain approximately 10 detecting neighbors. Of these, a predetermined number of the neighbors with the lowest path loss are flagged as "close neighbors" (for example, five stations). The information obtained from close neighbors may be treated differently or preferentially and the techniques used to transmit the information may also be adapted depending on the neighbors.

If a station is unable to acquire the minimum number of close neighbors when it is transmitting on full probe power, it is referred to as a "lonely neighbor". Other stations that have acquired the required number of close neighbors that can detect the lonely neighbor transmissions will let the lonely neighbor know that they are detected, and may provide additional information to the lonely neighbor.

When not probing or sending other messages, each station is listening for the probes of the other stations. When heard, the receiving station can use the transmit power information provided in the probe to establish the path loss to the station. As each station is constantly identifying the close neighbors with the lowest path loss, these neighbors are likely to be either in direct line of sight, or have the best signal with least interference.

Even stations merely able to listen will be in relatively good connectivity with a probing station in a fully operational network with many stations, as stations sending probes will likely have powered down their transmission levels in order to minimize their number of neighbors. In other words, neighbors are typically chosen for the quality of connectivity. Lonely neighbors are the exception, but will be recognized by the stations (hearing their full power transmissions and determining that they have less than the required number of collected neighbors) and assisted.

ODMA Over Wire (Over Ethernet and Over Internet)

The global ODMA network architecture enables the implementation of the ODMA network over a very wide area such as in a regional, national or global networks, by integrating wireless ODMA networks with one or more auxiliary packet switched networks using adapted forms of ODMA techniques. The auxiliary network could comprise conventional wired networks, such as Ethernet networks and the Internet, as well as "virtual" wired networks, such as the network created using satellite nodes, or any combination of these networks.

A component of the communication network of the invention is true peer-to-peer connectivity between a large number of moving ODMA subscriber stations, whether they are proximally close together or in different countries. Such peer-to-peer connectivity is offered over an auxiliary network which can use a different transmission medium from the mobile ODMA stations. Several actual "wired" and virtual "wired" packet switched media are available for use in such a "global network", but the most relevant of these media is the Internet or a private "Internet".

To make the overall network connectivity more resilient, the mobile subscriber stations should have many potential access points to the auxiliary network. Ideally, data transmissions should be routed through the most suitable wireless or wired media available at the moment the transmission is being sent onward, using ODMA protocols. To achieve this ideal, the location of the access points with optimal connectivity to the other wireless stations should be known with some certainty at any given time and this information should be refreshed on an ongoing basis due to the movement of the wireless stations. However, the manner in which stations are located should also be achieved without overburdening the auxiliary network medium with unnecessary probing transmissions.

Global ODMA Network Hardware and Infrastructure

Figure 29:
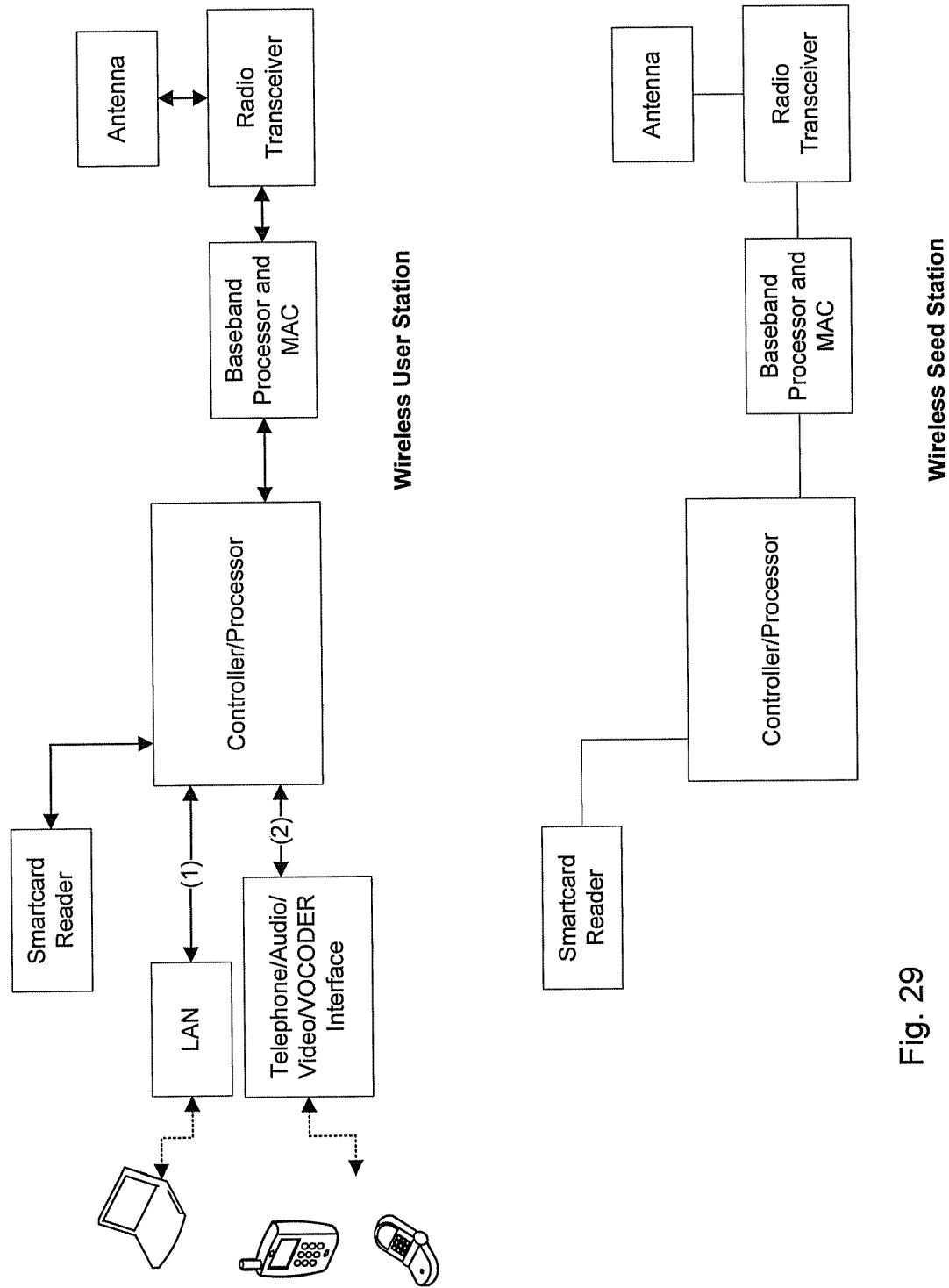
FIGS. 29 to 31 are simplified block schematic diagrams of the major hardware components of various different types of station making up the macro network.

Wireless Stations (Wireless Subscriber Stations and Wireless Seeds, also referred to as "A Stations")—FIG. 29

Wireless subscriber (user) stations are generally mobile wireless radio transceivers that communicate with other wireless subscriber stations and wireless seed stations (which are typically fixed but may be mobile) using ODMA over Wireless. Wireless subscriber stations typically have either an Ethernet interface that enables an associated computing device to receive and transmit data through the unit, or have connectivity to mobile telephone hardware to enable voice data transfer. The wireless stations communicate between themselves using ODMA over Wireless connectivity.

Wireless seed stations are similar to the wireless subscriber stations, providing additional wireless coverage by acting as intermediate stations for use by the wireless subscriber stations in communicating with each other. However, the seed stations generally do not have any other connections or interfaces as in the case of the wireless subscriber stations. Wireless seed stations are typically stationary, fixed installations, possibly having specialized antennas. However, these stations could also be mobile and could be mounted on a motor vehicle or a train, for example.

Figure 30:
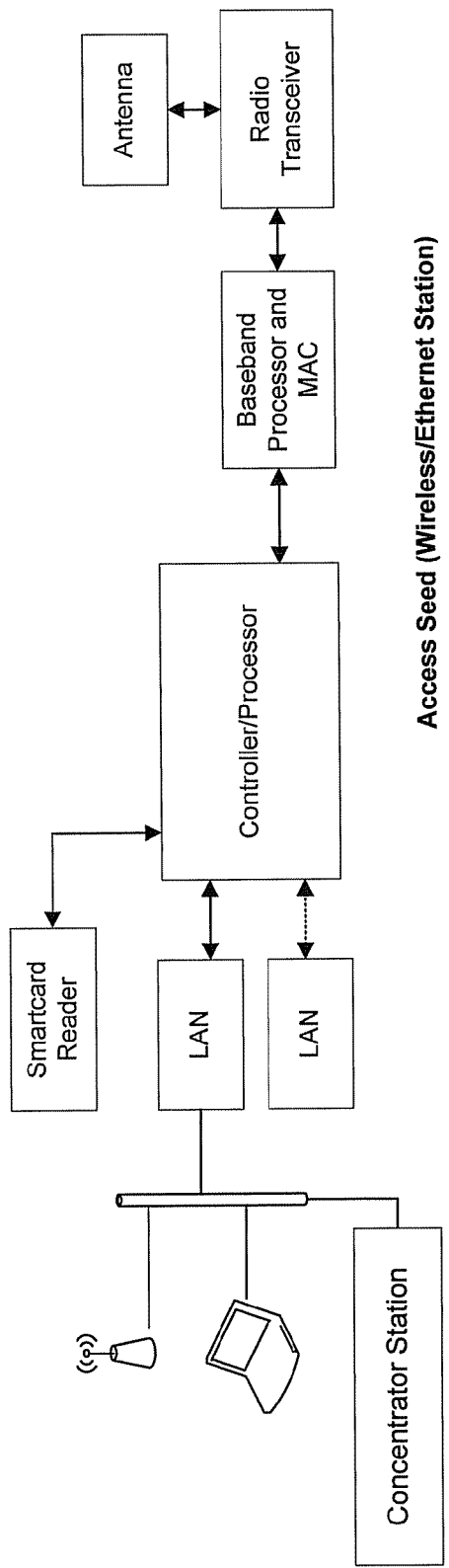

Access Seeds (Wireless to Ethernet Adapters, also referred to as "B Stations")—FIG. 30

The wireless to Ethernet adapters are similar to the wireless subscriber stations and wireless seed stations, but these units have the added capability of being linked together via an Ethernet backbone or sub-network using ODMA protocols due to the provision of an ODMA Ethernet interface. These devices support both ODMA over Wireless and ODMA over Ethernet. The station is similar to a wireless station but the LAN interface card is connected to an ODMA enabled Ethernet. The station may optionally include other LAN interface cards.

The adapters are typically used to create a cluster of wireless access points to increase throughput near an Internet connection point, or perhaps to join several such devices together over a large office Ethernet network. The Ethernet connection will usually be connected in a wired network with several other Wireless-Ethernet stations (access seeds) and a concentrator station (Ethernet to Internet adapter described below). The access seed stations may be located physically remote from the concentrator stations, and the Ethernet connections to the access seed stations may be via regular cabling, or through high capacity microwave links, fiber-optic cabling or the like as required.

Figure 31:
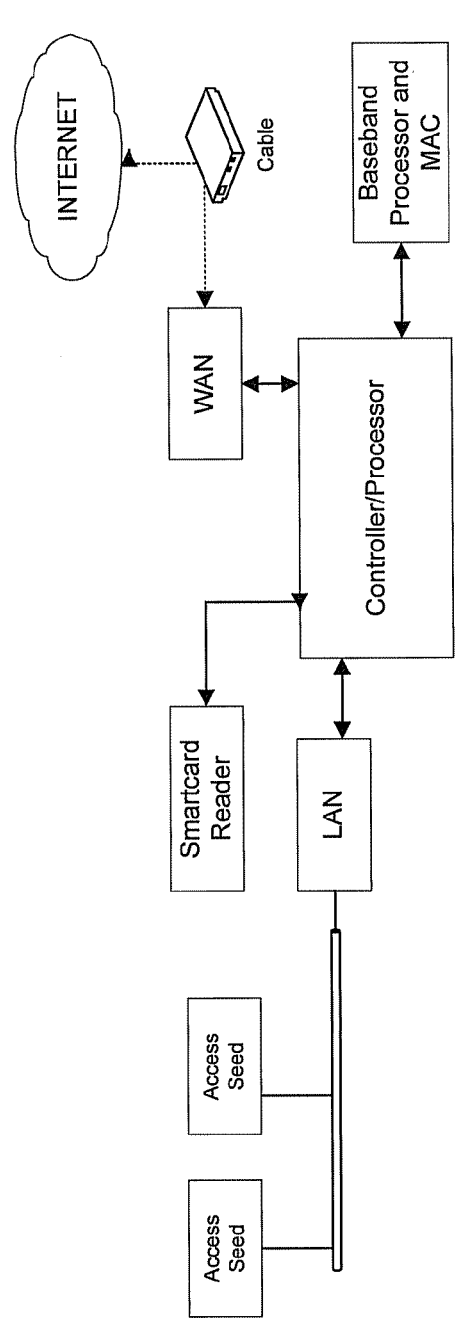

Concentrator Stations (Ethernet to Internet Adapters, also referred to as "C Stations")—FIG. 31

These devices provide a bridge between an ODMA over Ethernet network and the Internet at large and will have a fixed or dynamic Internet (IP) address on the Internet. Each device will maintain a cache of data identifying other concentrator stations that the unit has established are present on the Internet, and is able to locate such other devices by making requests to one or more Station Location Recording and Matching Servers and/or Authentication and Certification Servers. If the concentrator station has a dynamic address then the IP Address Management Server and/or the Station Location Recording and Matching Server will have to keep track of the concentrator station by matching the station with its ODMA address.

The core components of the concentrator stations are the same as for the wireless and access seed stations, but there is typically no wireless connectivity. Instead, a WAN interface (typically a cable modem) and a wired or cable connection to the Internet are provided. An ODMA Ethernet interface connects the station to an ODMA over Ethernet sub-network.

Overview of the ODMA Network Topology

Figure 32:
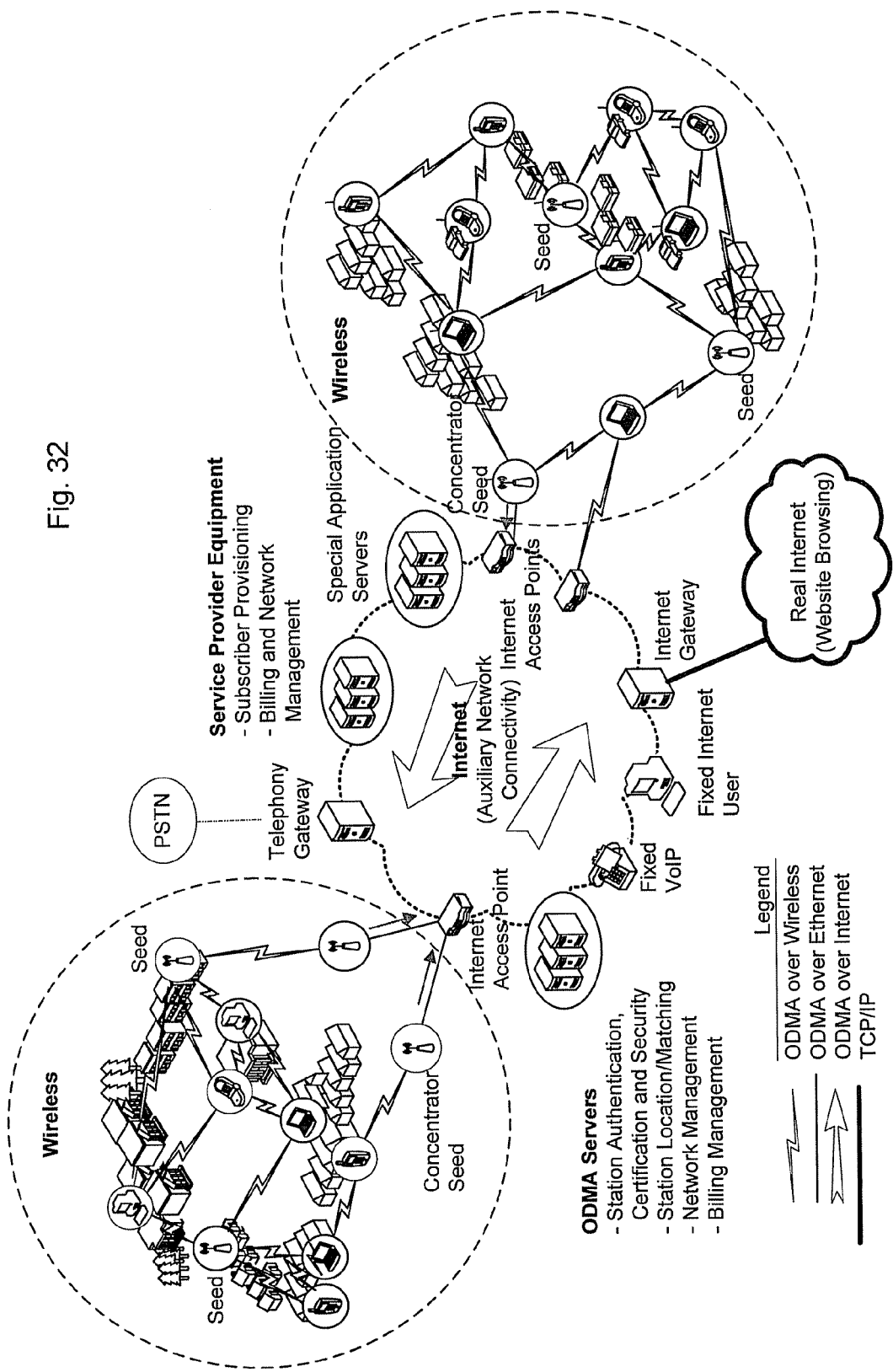
FIG. 32 is a schematic connectivity diagram of a wide area network showing the integration of mobile and wired networks and the use of different types of network stations.

FIG. 32 shows the topology of the global ODMA wide area network in a simplified schematic form. Message data may be transmitted from one mobile, wireless subscriber station (the originating station) to another (the destination station) within the immediate wireless area (ODMA over Wireless), or over a multi-medium ODMA network. In the global network, the message data is transmitted first over a wireless medium by the originating station, then over a wired medium (over one or more Ethernet networks and the public or private Internet network) before finally being transmitted again through a wireless medium to the destination station.

Multi-Medium Architecture

Various devices in the wide area communication network may be required to handle more than one disparate communications medium in order to communicate from originating station to destination station using the ODMA protocols. Since the characteristics of the various media vary greatly, different protocols and algorithms are adopted to handle the processing of the data transmission through each medium.

In particular, each medium (e.g. wireless, Ethernet and Internet, etc.) with its corresponding protocols (ODMA over Wireless, ODMA over Ethernet, ODMA over Internet, etc.) supported by a device has its own neighbor table and associated parameters which are of relevance to the medium. Neighbor gathering and the gathering of information relating to the quality of connectivity between stations is undertaken separately in each medium as appropriate, depending on the parameters that are relevant for that medium.

The gradient table constructed from originating station to destination station is common to all the various media, regardless of which media are utilized, and the gradients identified would be based on all the relevant neighbor information through each medium. Consequently, it should be evident that the gradient table is independent of any medium through which the data is actually subsequently transmitted.

Whatever the media utilized in the data transmission, the neighbors will operate collaboratively and track their relative strengths of connectivity. However, in a multi-medium network it is important to ensure that the cost functions used to route the data transmission through the various media are compatible, to ensure that the optimal route is followed.

ODMA Over Ethernet

Probing is undertaken via Ethernet broadcast packets. Data transmission is effected via directed Ethernet packets. Since slow probing is done relatively rarely, and neighbor costs are essentially all the same, the neighbor table could have a large number of neighbors relative to other media.

The access seed station can develop sets of neighbors where it is the point of connectivity between different Ethernet networks (each on the sections of the Ethernet joined by the ODMA unit). If one local area network is particularly busy and over utilized for either global or local traffic, the ODMA methodology is applied to the traffic in both neighborhoods. Each Ethernet group of stations cannot see the other group's stations as neighbors, but the access seed station acts as an intermediary which matches stations in each group when appropriate thereby serving as a local area multi-hop relay and facilitating one or more hops over the neighborhoods in the Ethernet medium. It will be appreciated that more than one access seed station could be joined to two (or more) local area networks of this nature.

ODMA Over Internet

The general ODMA environment envisages that every wireless station (wireless subscriber stations and seed stations) in the network repeatedly sends updated authentication messages on a periodic basis to the Authentication and Certification Servers. This is typically achieved through the Station Location Recording and Matching Server functionality.

Gradients from each station in the network to any number of potential Authentication and Certification Servers are maintained at all times. These Authentication and Certification Servers (through the Station Location Recording and Matching Servers) interact with any other Authentication and Certification Servers provided on the network to maintain updated tables of information on every station comprising the ODMA network (in fact all ODMA stations of any type will authenticate themselves on an ongoing basis).

When a wireless station sends a packet to the Authentication and Certification Server (up a gradient to the Authentication and Certification Server), it includes the information for the predetermined number of best concentrator stations that it has determined provide the best potential connectivity in the area of the wireless station. Each time an authentication packet is sent to the Authentication and Certification Server it will follow a gradient via a concentrator station and this information will also be added to the authentication packet. The Station Location Recording and Matching Server will consequently always have a relatively current record of the wireless stations that are in the area of certain concentrator stations. In addition, the wireless stations will know how to send an authentication to the Authentication and Certification Server at all times.

When any wireless station (the originating station) wishes to send information to another wireless station (the destination station) that it cannot contact by ODMA over wireless, it sends a packet to the Station Location Recording and Matching Server (typically via the best-placed concentrator stations in its area, although the message could in theory be transmitted over the wireless medium if the Server has this functionality). Packets may be sent to both the Station Location Recording and Matching Server and concentrator stations nearby to establish the best route available from the originating station to the destination station over the auxiliary network, as the destination station might already be known to a concentrator station.

At the simplest level, stations acting as nodes on the Internet do not need to access a Station Location Recording and Matching Server as such. When switched on, with access to the Internet (or other packet switched network), the station will automatically start probing for neighbors. There could be one or more initial addresses provided in the station's hardware to get the process going, and the addressee station(s) probed will provide information in respect of their own "well connected" neighbors and thereby advise of other stations that could be probed. All stations will ultimately locate each other in this manner as more addresses are made available to probe. As these neighbors are generally well connected, it is likely that they will have good connectivity with other well connected neighbors which ensure optimal transactions generally.

As each station maintains lists of wireless stations with which it is potentially in contact, a station on the Internet can locate wireless stations through this probing mechanism as well. The neighbor tables of the stations are updated on an ongoing basis, so any station should be able to keep track of well connected neighbors of its own and those of the destination station (whether on the auxiliary network or the wireless network). Once found, the key stations to probe as "neighbors on demand" can be updated continuously for as long as needed.

Assuming that the destination station is not immediately known to the concentrator stations or their immediate neighbors, the Station Location Recording and Matching Server will then determine the last known location of the destination station and establish from its tables which concentrator stations appear best suited for connectivity between the originating and destination stations. The Station Location Recording and Matching Server will tell the concentrator stations on the "originating side" of the Internet which other concentrator stations to probe via UDP on the "destination side." The best concentrator stations (as may be determined on an ongoing basis thereafter) in the region of the originating and destination stations will then be probing each other as long as the stations on both sides of the Internet "hop" require a gradient between them.

APPENDIX B

Network Multi-Tier Architecture

Figure 33:
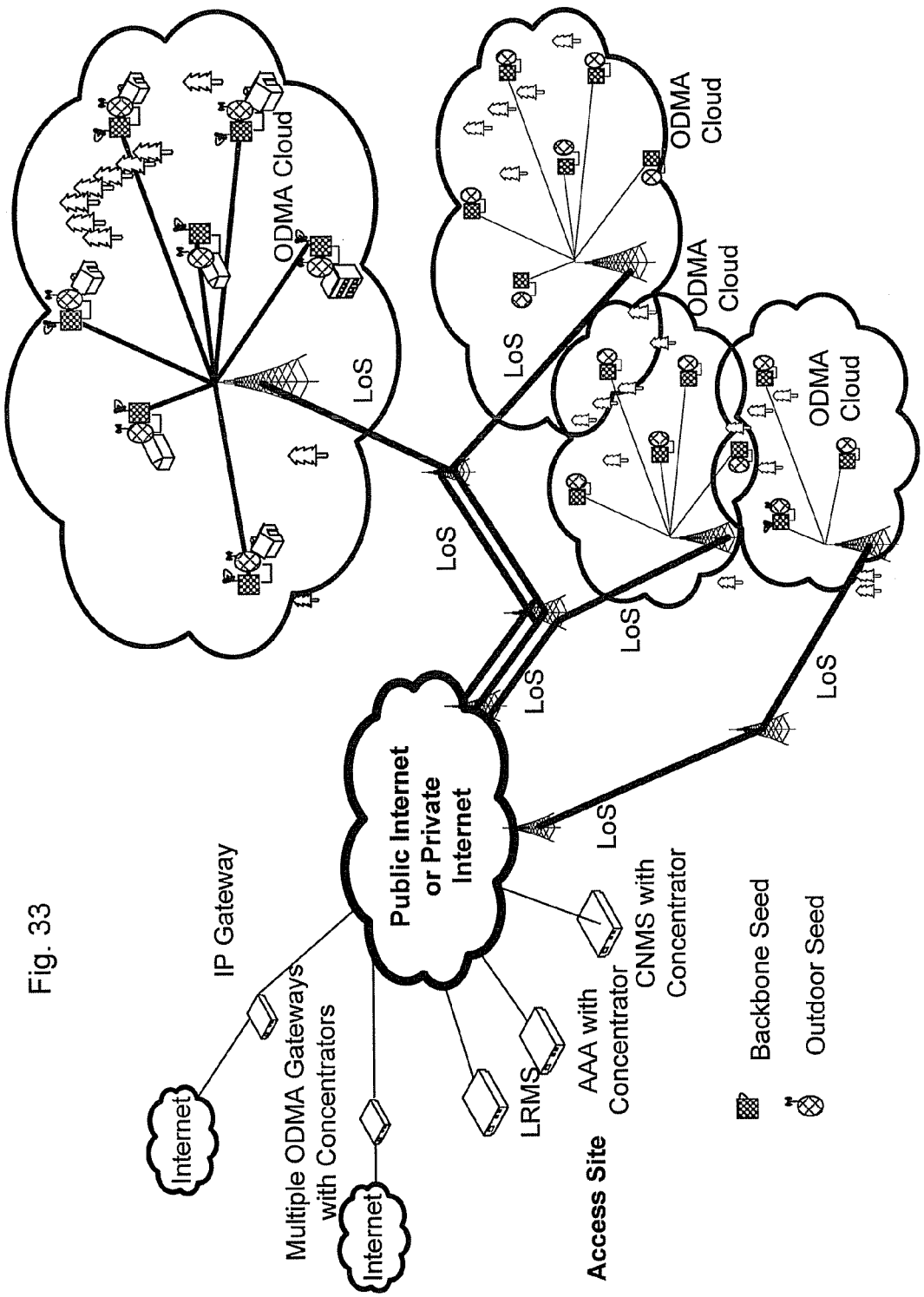
FIG. 33 is an example of a network topology of a multi-tier network.

A Multi-Tier architecture is depicted in FIG. 33 and consists of the following primary devices.

| Element | Definition |
| --- | --- |
| Access Site | Acting as the access to an IP backhaul, it facilitates management services for subscribers and provides high-bandwidth Internet access. |
| CPE | Customer-premises equipment, on-site wireless devices connecting fixed or portable computers or other devices (e.g. PDAs) to ODMA wireless networks. |
| Outdoor Seed | A device combining the functions of B, C (and usually ODMA gateway) stations. Used to associate CPEs in a Cell. |
| Backbone Seed | A device operating in WS mode when wired to an Outdoor Seed in a Cell; and used independently in AP mode to connect to Clouds. |
| Cell | Group of CPEs associated together by an Outdoor Seed and Backbone Seed. |
| Cloud | Group of Cells connected by Backbone Seeds. |

The Multi-Tier Access Site typically consists of the following devices.

| Level | Components |
| --- | --- |
| Access site | ODMA Gateway and Concentrator combinations Locator (LRMS) |

| Level | Components |
|---|---|
| | Authenticator (AAA) with Concentrator Network Management Server (CNMS) IP Gateway, for Internet connectivity at large |

Figure 34:
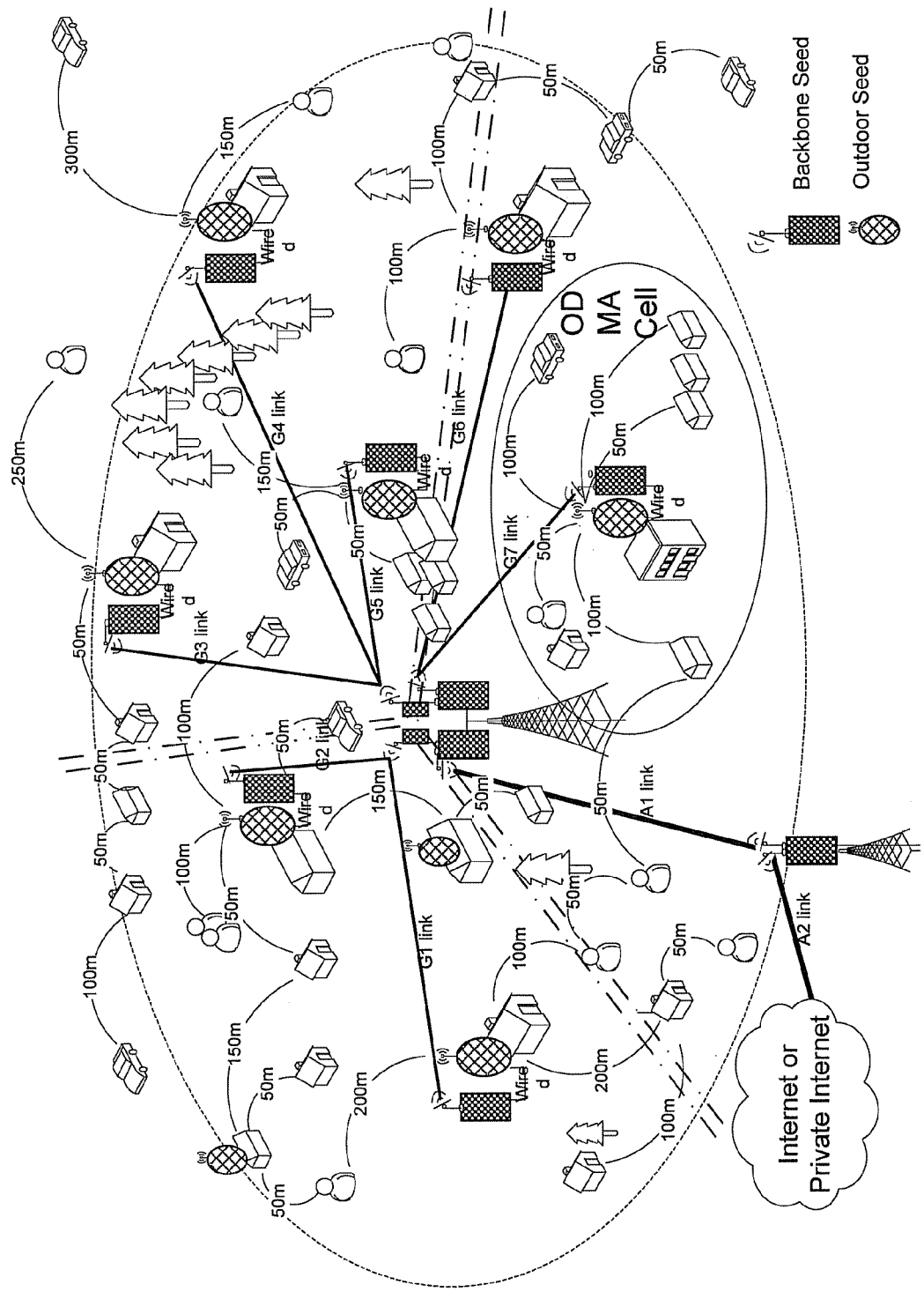
FIG. 34 is a detailed view of an ODMA Cell and an ODMA Cloud in the network of FIG. 33.

An ODMA Cell is shown in more detail in FIG. 34 and consists of one Outdoor Seed and Backbone Seed wired pairing and a number of CPEs in connectivity. The Outdoor Seed uses an omni-antenna or sector antenna to enable appropriate wide coverage of the local area. The Backbone Seed uses a directed antenna to connect in wireless station ("WS mode") to another Backbone Seed, typically located near the center of the Cloud.

Each 802.11g CPE located in the Cell and linked to the Outdoor Seed presently has a throughput of 300 Kbps or more over 4 hops and 3 Mbps over 1 hop. The typical coverage of a Cell is a radius of 300 m over 1 hop.

ODMA CPEs located in an ODMA Cell will connect through the 802.11a Outdoor Seed to the ODMA network. Each CPE can link to the Outdoor Seed by one or more hops. The distance between each peer is typically 50-300 m. All peers in the Cell can connect outside the ODMA Cloud or to the Internet through a Backbone Seed wired with an Outdoor Seed, located in each Cell.

Backbone Seeds are configured to connect back to an "AP mode" Backbone Seed located on other towers or high sites. Clouds An ODMA Cloud is shown in FIG. 34, composed of Backbone Seeds located near the center of the Cloud, and a number of ODMA Cells linked to each other by these Backbone Seeds. These links will have a bandwidth of 3 Mbps or more.

Each Backbone Seed typically uses a 120° patch antenna to provide part of a wide area of coverage, and is mounted on a highly elevated site. Backbone Seeds extend ODMA coverage by connecting Cells in Clouds, providing multiple redundancy and increased throughput. Within the Cloud, another Backbone Seed uses a dedicated high-gain antenna to link back to the Access Site through another Backbone Seed located on another tower, directing CPE traffic to and from the ODMA infrastructure over that 802.11a band. The trunk links have clear line of sight to neighboring Backbone Seeds, operating high above the clutter, and have a bandwidth of approximately 10-20 Mbps depending on the conditions. Cloud coverage is typically a radius from 1-10 km (Line of Sight—LoS), being dependent on antenna and conditions.

Outdoor Seeds provide last-mile connectivity over the ODMA network; typically being placed on the roof of a house. Throughput is approximately 3 Mbps, using an omni-antenna over the 802.11g band.

ODMA Clouds provide redundancy in the event of connection failure between the Backbone Seeds. Peers in the affected Cell can hop to another Cell and access the Backbone Seed belonging to that other Cell. For example, if the connection to the G7 Backbone Seed of FIG. 34 was unavailable, peers within the Cell could connect to the G6 Backbone Seed instead, and use it to reach the trunk link.

Typical antenna Requirements are as follows.

| Device | Connection | Antenna type | Line Of Sight | Fresnel Zone | RF Band |
|---|---|---|---|---|---|
| Backbone Seed | Trunk link | High gain directed | Yes | Totally unobstructed | 802.11a |
| Backbone Seed | Cell link | Patch 120 degrees | Yes | Largely unobstructed | 802.11a |
| Backbone Seed | Cell link (client side) | Directed | Yes | Largely unobstructed | 802.11a |
| Outdoor Seed | ODMA link | Omni | Desirable only | Desirable only | 802.11g |

The invention claimed is:

1. A method of operating a communication network comprising a plurality of wireless stations, each station being able to transmit and receive data so that the network can transmit a message comprising a plurality of data packets from an originating station to a destination station via at least one intermediate station, wherein at least some stations have a controllable antenna system operable to direct a null selectively, the method including the steps of:
   (a) selecting, at each station, one or more probing channels for the transmission of probe signals to other stations;
   (b) detecting, at stations having a controllable antenna system, the presence of out of network interference on said one or more probing channels and selectively directing one or more nulls towards the source or sources of the out of network interference; and
   (c) transmitting neighbor gathering probe signals from each station on the selected probing channel or channels, other stations which receive the neighbor gathering probe signals from a probing station responding directly or indirectly to thereby indicate to the probing station their availability as destination or intermediate neighbor stations;
   wherein the presence of said null or nulls affects the ability of other stations to receive the neighbor gathering probe signals, the resulting variations in the connectivity between said each station and other stations thereby providing variations in the availability of neighbor stations to said each station.

2. A method according to claim 1 wherein a null is directed towards a source of out of network interference where the level of the interference exceeds a predetermined level.

3. A method according to claim 2 wherein the predetermined level of interference corresponds to the ambient noise floor on said probing channel.

4. A method according to claim 1 including operating an antenna system at one or more stations to steer the radiation pattern of the antenna system in order to direct one or more nulls towards the sources of out of network interference, thereby affecting connectivity of neighboring stations and introducing diversity into the connectivity options available to the stations.

5. A method according to claim 1 wherein a source of interference is a broadcast station, and said each station directs a null towards the broadcast station to reduce or eliminate interference.

6. A method according to claim 5 wherein two or more neighbor stations direct nulls toward each other.

7. A method according to claim 1 wherein stations with controllable antennas direct beams selectively, the method including mapping, at each such station, the location of other stations to a particular beam or beams for ongoing communication.

8. A method according to claim 1 wherein stations with controllable antennas monitor said one or more probing channels for noise or out of network interference, the method including mapping, at each such station, the location of other stations to a particular beam or beams determined to provide relatively noise or interference free communication to said other stations.

9. A method according to claim 7 including storing data relating to the mapped locations at each station, and transmitting the data to other stations in probe signals.

10. A method according to claim 7 wherein a station transmitting a probe signal or data to another station selects a beam previously determined to be interference or noise free.

11. A communication network comprising a plurality of wireless stations, each station being able to transmit and receive data so that the network can transmit a message comprising a plurality of data packets from an originating station to a destination station via at least one intermediate station, wherein at least some stations have a controllable antenna system operable to direct a null selectively, and wherein each such station is operable to:
 (a) select one or more probing channels for the transmission of probe signals to other stations;
 (b) detect the presence of out of network interference on said one or more probing channels and selectively directing one or more nulls towards the source or sources of the out of network interference; and
 (c) transmit neighbor gathering probe signals from each station on the selected probing channel or channels, other stations which receive the neighbor gathering probe signals from a probing station responding directly or indirectly to thereby indicate to the probing station their availability as destination or intermediate neighbor stations;
wherein the presence of said null or nulls affects the ability of other stations to receive the neighbor gathering probe signals, the resulting variations in the connectivity between said each station and other stations thereby providing variations in the availability of neighbor stations to said each station.

12. A communication network according to claim 11, wherein a null is directed towards a source of out of network interference where the level of the out of network interference exceeds a predetermined level.

13. A communication network according to claim 12, wherein the predetermined level of out of network interference corresponds to the ambient noise floor on said probing channel.

14. A communication network according to claim 11, including operating an antenna system at one or more stations to steer the radiation pattern of the antenna system in order to direct one or more nulls towards the sources of out of network interference, thereby affecting connectivity of neighboring stations and introducing diversity into the connectivity options available to the stations.

15. A communication network according to claim 11, wherein stations with controllable antennas direct beams selectively, the method including mapping, at each such station, the location of other stations to a particular beam or beams for ongoing communication.

16. A communication network according to claim 11, wherein stations with controllable antennas monitor said one or more probing channels for noise or out of network interference, the method including mapping, at each such station, the location of other stations to a particular beam or beams determined to provide relatively noise or out of network interference free communication to said other stations.

17. A communication network according to claim 16, including storing data relating to the mapped locations at each station, and transmitting the data to other stations in probe signals.

18. A communication network according to claim 17, wherein a station transmitting a probe signal or data to another station selects a beam previously determined to be out of network interference or noise free.

* * * * *